United States Patent
Engelhardt et al.

(10) Patent No.: US 8,812,544 B2
(45) Date of Patent: Aug. 19, 2014

(54) ENTERPRISE CONTENT MANAGEMENT FEDERATION AND INTEGRATION SYSTEM

(75) Inventors: Jeffrey S. Engelhardt, Jacksonville, FL (US); Jorge A. Chrystman, Jacksonville, FL (US); Michelle Coffey, Charlotte, NC (US); Christine Cottrell, Jacksonville, FL (US); Kelly D. Cummings, Orange Park, FL (US); Michael R. Evans, Jacksonville, FL (US); David Michael Fredrikson, North Kingstown, RI (US); Robert C. Gorter, Jacksonville, FL (US); Kenneth B. Kebel, Robbinsville, NJ (US); Edmund M. Knowles, Flemington, NJ (US); Shawn Christopher Ledbury, Jacksonville, FL (US); John W. Sullivan, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 277 days.

(21) Appl. No.: 13/019,051

(22) Filed: Feb. 1, 2011

(65) Prior Publication Data

US 2012/0030240 A1 Feb. 2, 2012

Related U.S. Application Data

(60) Provisional application No. 61/368,886, filed on Jul. 29, 2010.

(51) Int. Cl.
*G06F 17/30* (2006.01)
*G06Q 10/00* (2012.01)
(52) U.S. Cl.
CPC .......... *G06Q 10/00* (2013.01); *G06F 17/30289* (2013.01)

USPC .......................................................... 707/778
(58) Field of Classification Search
CPC ...................................................... G06F 17/30
USPC .......................................................... 707/778
See application file for complete search history.

(56) References Cited

U.S. PATENT DOCUMENTS

| 2005/0005261 A1* | 1/2005 | Severin .......................... 717/108 |
| 2005/0076021 A1* | 4/2005 | Wu et al. ............................ 707/3 |
| 2011/0010461 A1* | 1/2011 | Lassila et al. ................. 709/231 |

OTHER PUBLICATIONS

Lewis, Mark, chief strategy officer of EMC, "Mark's Blog", http://marksblog.emc.com/; 10 pages total.

* cited by examiner

*Primary Examiner* — Khanh Pham
*Assistant Examiner* — Johnese Johnson
(74) *Attorney, Agent, or Firm* — Michael A. Springs; Moore & Van Allen PLLC; Patrick B. Horne

(57) ABSTRACT

An enterprise content management federation and integration system integrates a plurality of applications and federates information seamlessly by receiving, by a composite system, a request from a client system. The system then translates, by a manager system, the request from the client system. The manager system performs one or more high level validations and retrieves information from a mapping stored by an ontology modeling system, a plurality of content types, repositories, actions and object types based at least in part on a plurality of attributes including one or more metadata models or attribute models. The manager system then invokes one or more composites based at least in part on the request from the client system and some or all the information retrieved from the mapping.

41 Claims, 23 Drawing Sheets

ENTERPRISE CONTENT MANAGEMENT FEDERATION AND INTEGRATION SYSTEM

CLAIM OF PRIORITY UNDER 35 U.S.C. §119

This Non-provisional patent application claims priority to Provisional Patent Application Ser. No. 61/368,886 titled "Enterprise Content Management Federation and Integration System" filed Jul. 29, 2010, assigned to the assignee hereof and hereby expressly incorporated by reference herein.

FIELD

In general, embodiments of the invention relate to systems for enterprise content management. More specifically, embodiments of the invention relate to systems for enterprise management configured for integrating applications and federating information.

BACKGROUND

Enterprise content management (ECM) systems, over the last 25 years, have developed from simple silo digital imaging solutions to relatively complex and vastly capable components of daily enterprise business processes. As the systems have developed, organizations continue to grow, and developing and implementing vast numbers of applications in various lines of business within an organization can be difficult. The problem is further complicated by continual growth of large scale organizations through mergers and acquisitions, thereby requiring the ECM systems to "integrate" applications across disparate platforms and unify services provided to each line of business within the merged organizations. Further, demand to access data and information across multiple platforms and data repositories in a seamless and transparent fashion, which is typically referred to as "federation," continues to increase.

Hence, a system for leveraging data, information, and content across new applications and retaining the data, information and content for use with legacy applications is needed. Therefore, an enterprise management system configured for integrating applications and federating information across disparate platforms is provided.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing methods, computer program products and enterprise content management systems for integrating a plurality of applications and federating information. The systems receive, by a composite system, a request from a client system. The system then translates, by a manager system, the request from the client system. The manager system performs one or more high level validations and retrieves information from a mapping stored by an ontology modeling system, a plurality of content types, repositories, actions and object types based at least in part on a plurality of attributes including one or more metadata models or attribute models. The manager system then invokes one or more composites based at least in part on the request from the client system and some or all the information retrieved from the mapping.

According to embodiments of the present invention, an enterprise content management integration and federation system for integrating a plurality of applications and federating information includes a composite system configured for receiving a request from a client system, the composite system. The composite system includes a manager system configured for translating the request from the client system and performing one or more high level validations. The enterprise content management system also includes an ontology modeling system configured for retrieving information from a mapping of a plurality of entities, the mapping comprising a plurality of attributes. The manager system is further configured for invoking one or more composites based at least in part on the request from the client system and some or all the information retrieved from the mapping.

In some embodiments, the plurality of entities includes one or more content types. In some such embodiments, the one or more content types each corresponds to one or more content items. In some embodiments, the plurality of entities includes one or more repositories. In some embodiments, the plurality of entities includes one or more actions. In some embodiments, the plurality of entities includes one or more object types. In some embodiments, the plurality of attributes comprise one or more metadata models. In some embodiments, the plurality of attributes comprise one or more attribute models.

In some embodiments, the plurality of entities includes one or more content types, one or more repositories, one or more actions, and one or more object types. In some such embodiments, the ontology modeling system is further configured for mapping one or more content types with one or more repositories such that the one or more content types references the one or more repositories. In other such embodiments, the ontology modeling system is further configured for mapping one or more repositories with one or more object types, thereby indicating that the one or more object types are included in the one or more repositories. In yet other such embodiments, the ontology modeling system is further configured for mapping one or more content types and one or more actions such that the one or more content types exposes the one or more actions. In other such embodiments, the ontology modeling system is further configured for mapping one or more actions and one or more repositories such that the one or more actions executes against one or more repositories.

According to embodiments of the invention, a method for enterprise content management including integrating a plurality of applications and federating information includes receiving, by a composite system, a request from a client system, translating, by a manager system, the request from the client system, performing, by the manager system, one or more high level validations, retrieving information from a mapping, by an ontology modeling system, of a plurality of entities, the mapping comprising a plurality of attributes including one or more metadata models or attribute models, and invoking, by the manager system, one or more composites based at least in part on the request from the client system and some or all the information retrieved from the mapping.

In some embodiments, the plurality of entities includes one or more content types. In some such embodiments, the one or more content types each corresponds to one or more content items. In some embodiments, the plurality of entities includes one or more repositories. In some embodiments, the plurality of entities includes one or more actions. In some embodiments, the plurality of entities includes one or more object types. In some embodiments, the plurality of attributes comprise one or more metadata models. In some embodiments, the plurality of attributes comprise one or more attribute models. In some embodiments, the composite system, the manager system and the ontology system are the same system comprising a processing device and wherein the steps of retrieving, translating, performing, retrieving and invoking are executed by the processing device. In some embodiments, the composite system and the manager system are the same system comprising a processing device and wherein the steps of retrieving, translating, performing, and invoking are executed by the processing device.

In some embodiments, the plurality of entities includes one or more content types, one or more repositories, one or more actions, and one or more object types. In some such embodiments, the method also includes mapping, by the ontology modeling system, one or more content types with one or more repositories such that the one or more content types references the one or more repositories. In some such embodiments, the method also includes mapping, by the ontology modeling system, one or more repositories with one or more object types, thereby indicating that the one or more object types are included in the one or more repositories. In some such embodiments, the method also includes mapping, by the ontology modeling system, one or more content types and one or more actions such that the one or more content types exposes the one or more actions. In some such embodiments, the method also includes mapping, by the ontology modeling system, one or more actions and one or more repositories such that the one or more actions executes against one or more repositories.

According to embodiments of the invention, a computer program product comprising a non-transient computer-readable memory comprising computer-executable instructions for enterprise content management including integrating a plurality of applications and federating information. The instructions include instructions for receiving a request from a client system, instructions for translating the request from the client system, instructions for performing one or more high level validations, instructions for retrieving information from a mapping of a plurality of entities, and instructions for invoking, by the manager system, one or more composites based at least in part on the request from the client system and some or all the information retrieved from the mapping.

In some embodiments, the plurality of entities includes one or more content types. In some such embodiments, the one or more content types each corresponds to one or more content items. In some embodiments, the plurality of entities includes one or more repositories. In some embodiments, the plurality of entities includes one or more actions. In some embodiments, the plurality of entities includes one or more object types. In some embodiments, the plurality of attributes comprise one or more metadata models. In some embodiments, the plurality of attributes comprise one or more attribute models. In some embodiments, the plurality of entities includes one or more content types, one or more repositories, one or more actions, and one or more object types.

In some embodiments, the instructions also include mapping one or more content types with one or more repositories such that the one or more content types references the one or more repositories. In some embodiments, the instructions also include mapping one or more repositories with one or more object types, thereby indicating that the one or more object types are included in the one or more repositories. In some embodiments, the instructions also include mapping one or more content types and one or more actions such that the one or more content types exposes the one or more actions. In some embodiments, the instructions also include mapping one or more actions and one or more repositories such that the one or more actions executes against one or more repositories.

According to embodiments of the present invention, an ontology modeling system is associated with enterprise content management and includes a processing device configured for mapping a plurality of entities with one another, the plurality of entities comprising one or more content types, one or more repositories, one or more object types, and one or more actions. The mapping includes associating the one or more content types with one or more repositories such that the one or more content types references the one or more repositories, associating the one or more repositories with one or more object types such that the one or more object types associating the one or more content types and one or more actions such that the one or more content types exposes the one or more actions, and associating the one or more action and the one or more repositories such that the one or more actions executes against one or more repositories.

In some embodiments, the processing device is further configured for retrieving, in response to a request from a manager system, information from the mapping of the plurality of entities. In some embodiments, the processing device is further configured for mapping one or more pieces of metadata, one or more expressions, one or more attribute types, and one or more content items, and the mapping includes associating the one or more expressions with one or more pieces of metadata such that the one or more expressions validates the one or more pieces of metadata, associating the one or more content types with one or more pieces of metadata such that the one or more content types references the one or more pieces of metadata, associating the one or more pieces of metadata with one or more attribute types such that the one or more pieces of metadata maps to one or more attribute types, associating the one or more object types with one or more attribute types such that the one or more object types exposes one or more attribute types, associating the one or more actions with one or more pieces of metadata such that the one or more actions uses one or more pieces of metadata, and associating the one or more content types with one or more content items such that the one or more content types includes one or more content items.

According to embodiments of the invention, a method for enterprise content management includes mapping, by an ontology modeling system, a plurality of entities with one another, the plurality of entities comprising one or more content types, one or more repositories, one or more object types, and one or more actions, and the mapping includes associating the one or more content types with one or more repositories such that the one or more content types references the one or more repositories, associating the one or more repositories with one or more object types such that the one or more object types, associating the one or more content types and one or more actions such that the one or more content types exposes the one or more actions, and associating the one or more action and the one or more repositories such that the one or more actions executes against one or more repositories.

In some embodiments, the method also includes retrieving, by the ontology modeling system, in response to a request from a manager system, information from the mapping of the plurality of entities. In some embodiments, the method also includes mapping, by the ontology modeling system, one or more pieces of metadata, one or more expressions, one or more attribute types, and one or more content items. The mapping includes associating the one or more expressions with one or more pieces of metadata such that the one or more expressions validates the one or more pieces of metadata, associating the one or more content types with one or more pieces of metadata such that the one or more content types references the one or more pieces of metadata, associating the one or more pieces of metadata with one or more attribute types such that the one or more pieces of metadata maps to one or more attribute types, associating the one or more object types with one or more attribute types such that the one or more object types exposes one or more attribute types, associating the one or more actions with one or more pieces of metadata such that the one or more actions uses one or more pieces of metadata, and associating the one or more content types with one or more content items such that the one or more content types includes one or more content items.

According to embodiments of the invention, a computer program product includes a non-transient computer-readable medium comprising computer-executable instructions for enterprise content management. The instructions include instructions for mapping a plurality of entities with one another, the plurality of entities comprising one or more content types, one or more repositories, one or more object types, and one or more actions. The instructions for mapping include instructions for associating the one or more content types with one or more repositories such that the one or more content types references the one or more repositories, instructions for associating the one or more repositories with one or more object types such that the one or more object types, instructions for associating the one or more content types and one or more actions such that the one or more content types exposes the one or more actions, and instructions for associating the one or more action and the one or more repositories such that the one or more actions executes against one or more repositories.

In some embodiments, the instructions also include instructions for retrieving in response to a request from a manager system, information from the mapping of the plurality of entities. In some embodiments, the instructions also include instructions for mapping one or more pieces of metadata, one or more expressions, one or more attribute types, and one or more content items, and the instructions for mapping include instructions for associating the one or more expressions with one or more pieces of metadata such that the one or more expressions validates the one or more pieces of metadata, instructions for associating the one or more content types with one or more pieces of metadata such that the one or more content types references the one or more pieces of metadata, instructions for associating the one or more pieces of metadata with one or more attribute types such that the one or more pieces of metadata maps to one or more attribute types, instructions for associating the one or more object types with one or more attribute types such that the one or more object types exposes one or more attribute types, instructions for associating the one or more actions with one or more pieces of metadata such that the one or more actions uses one or more pieces of metadata, and instructions for associating the one or more content types with one or more content items such that the one or more content types includes one or more content items.

The following description and the annexed drawings set forth in detail certain illustrative features of one or more embodiments of the invention. These features are indicative, however, of but a few of the various ways in which the principles of various embodiments may be employed, and this description is intended to include all such embodiments and their equivalents.

BRIEF DESCRIPTION OF THE DRAWINGS

Figure 1A:
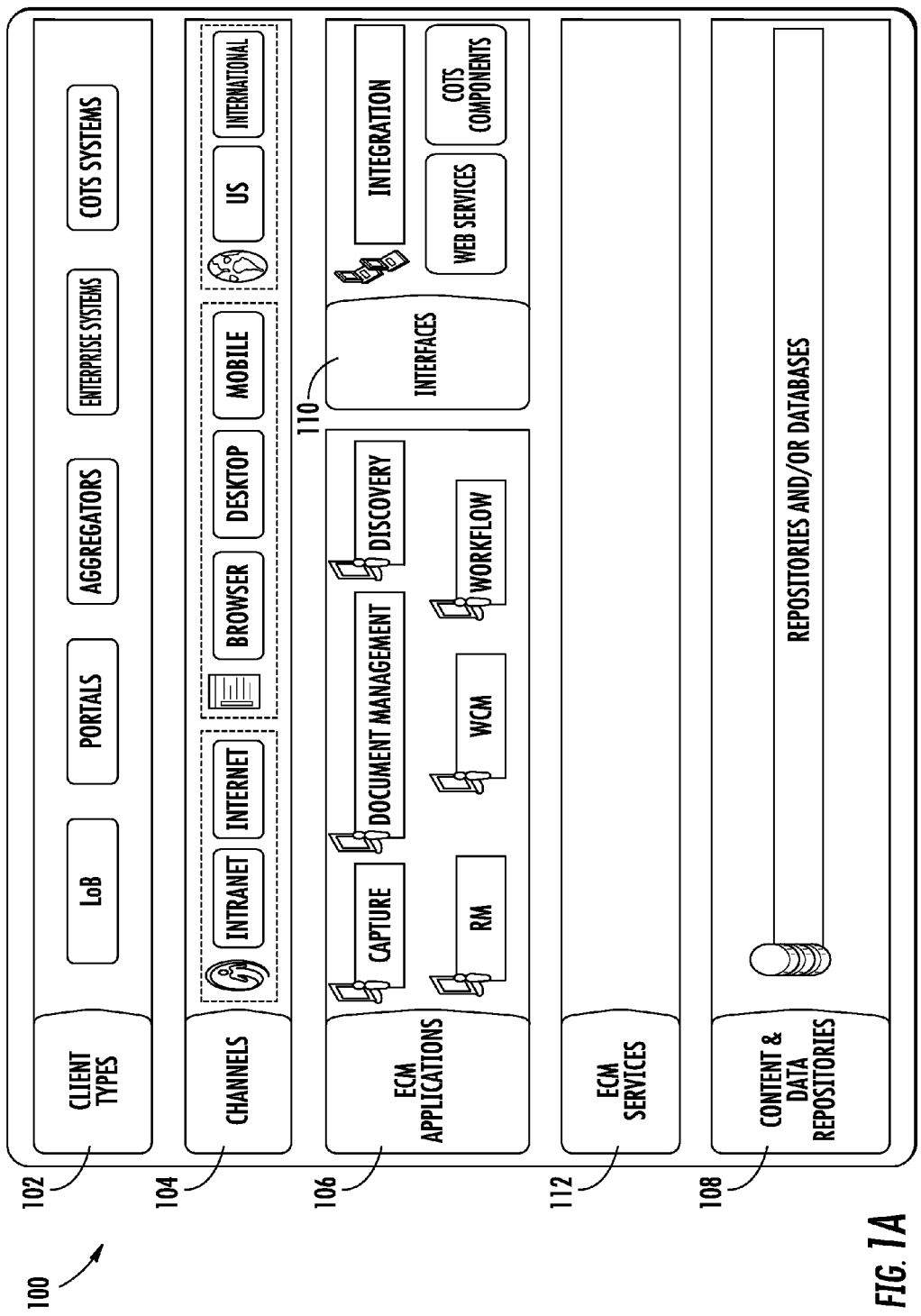
Figure 1B:
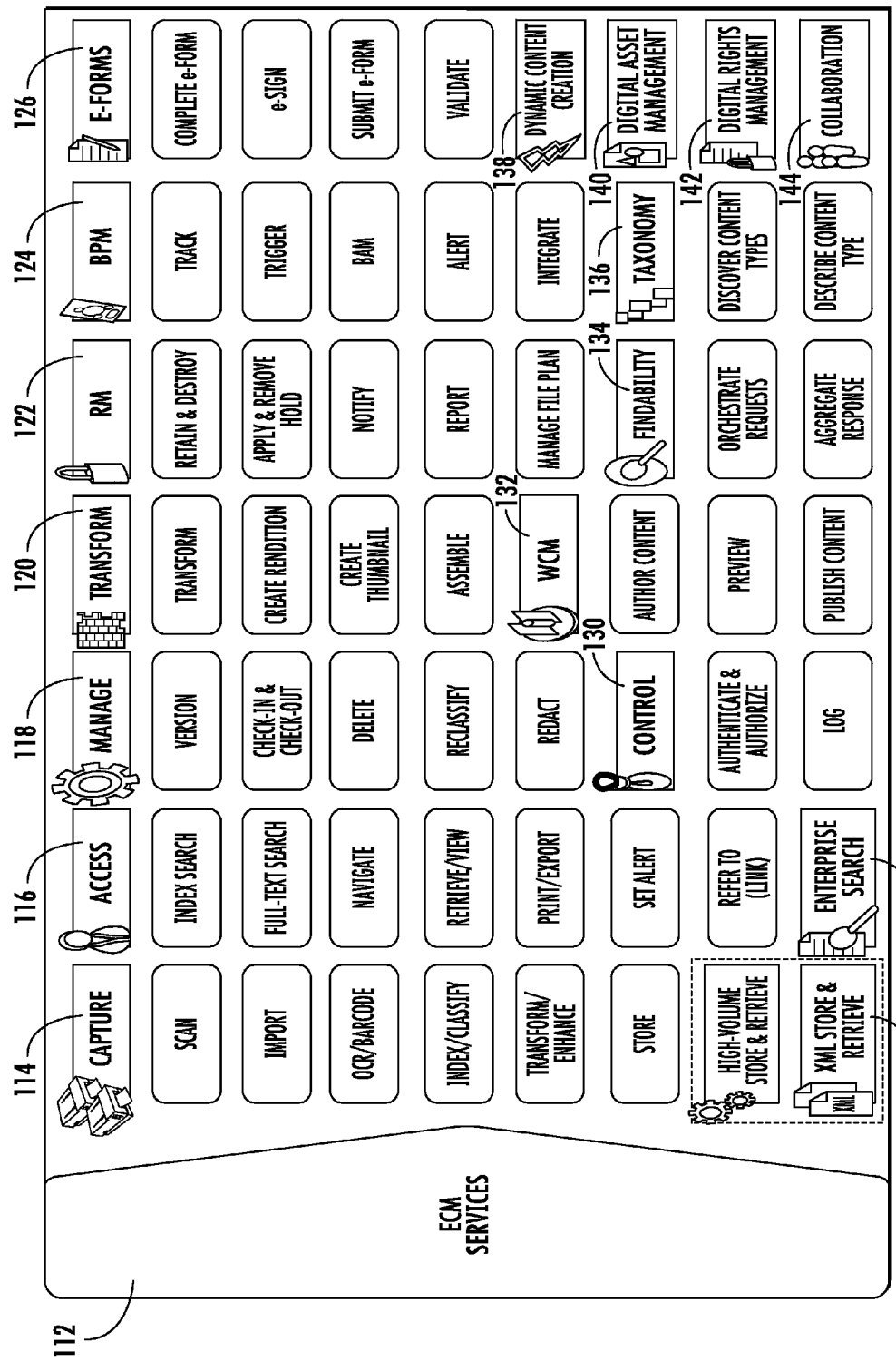
Figure 2:
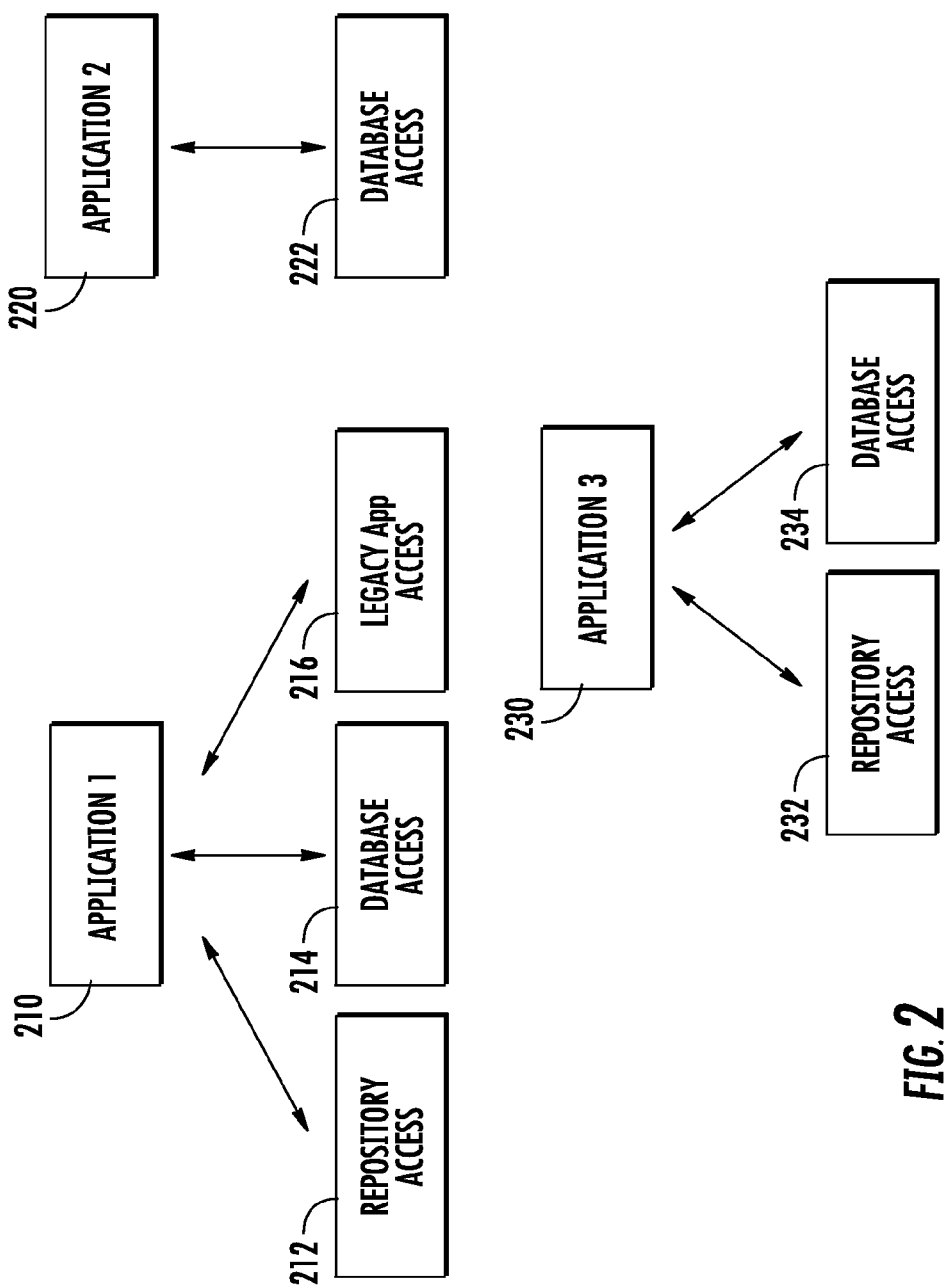
Figure 3:
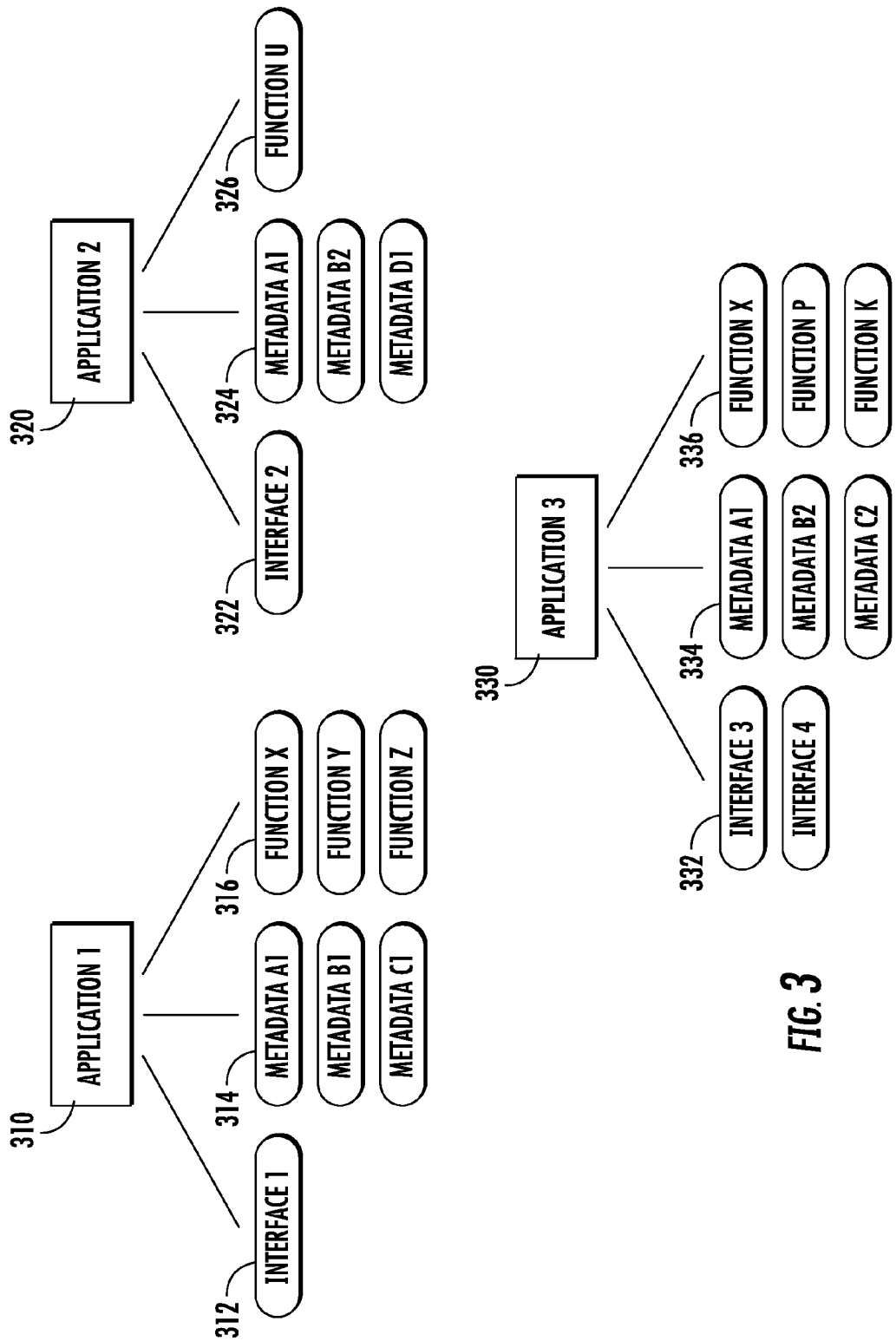
Figure 4:
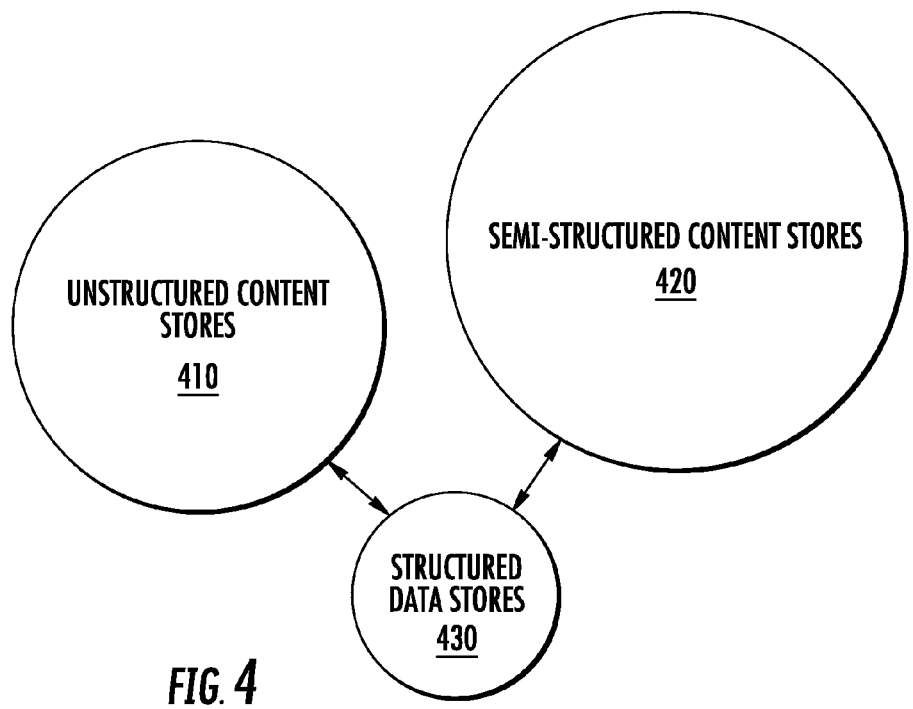
Figure 5A:
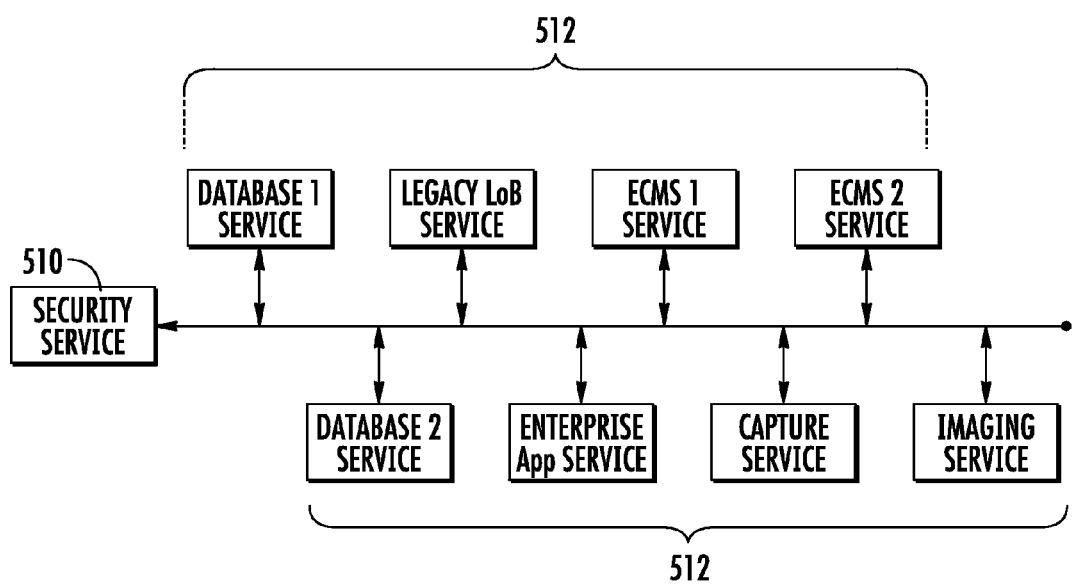
Figure 5B:
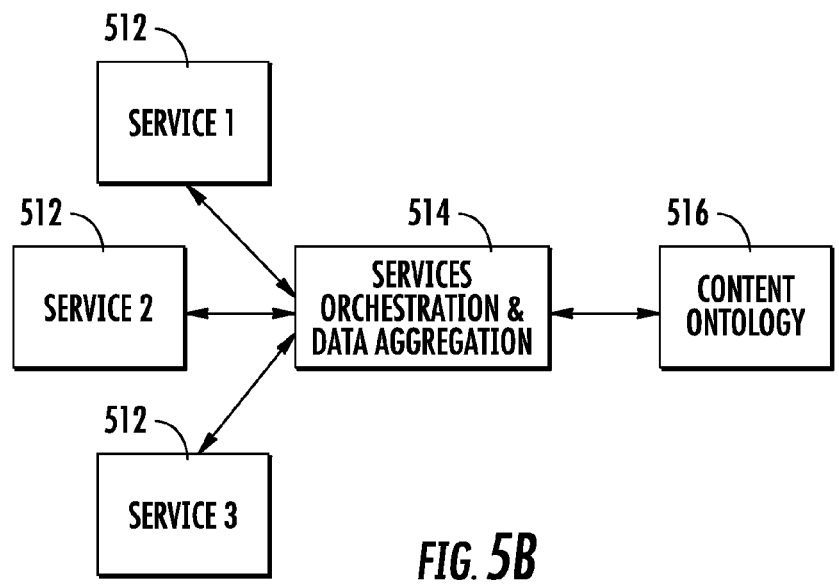
Figure 6:
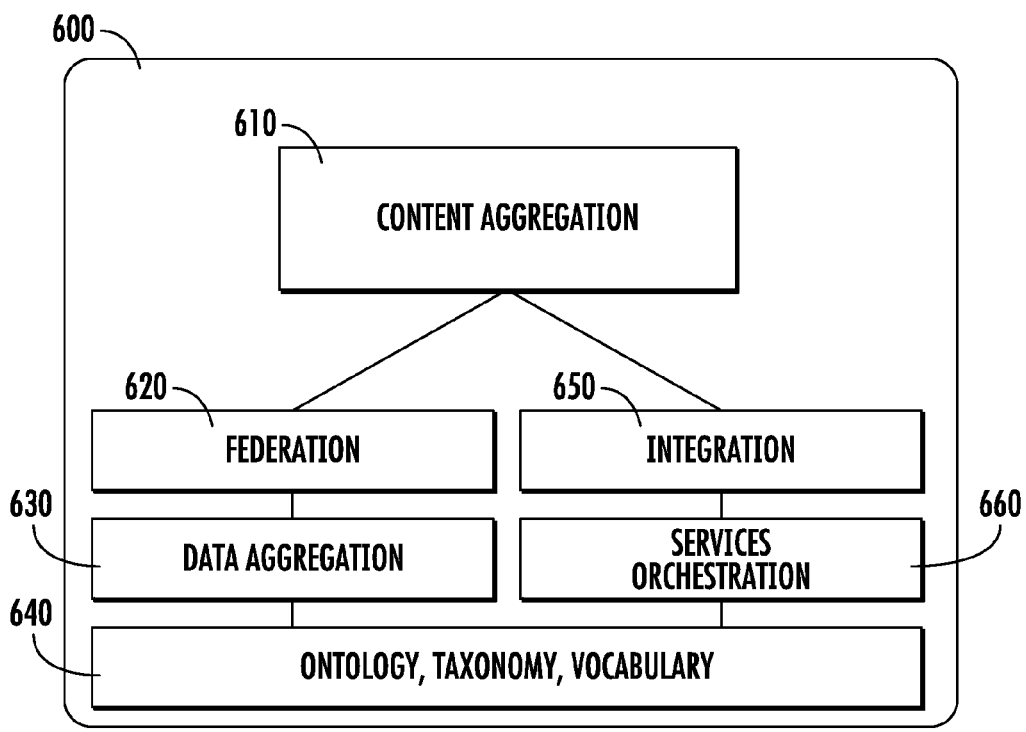
Figure 8A:
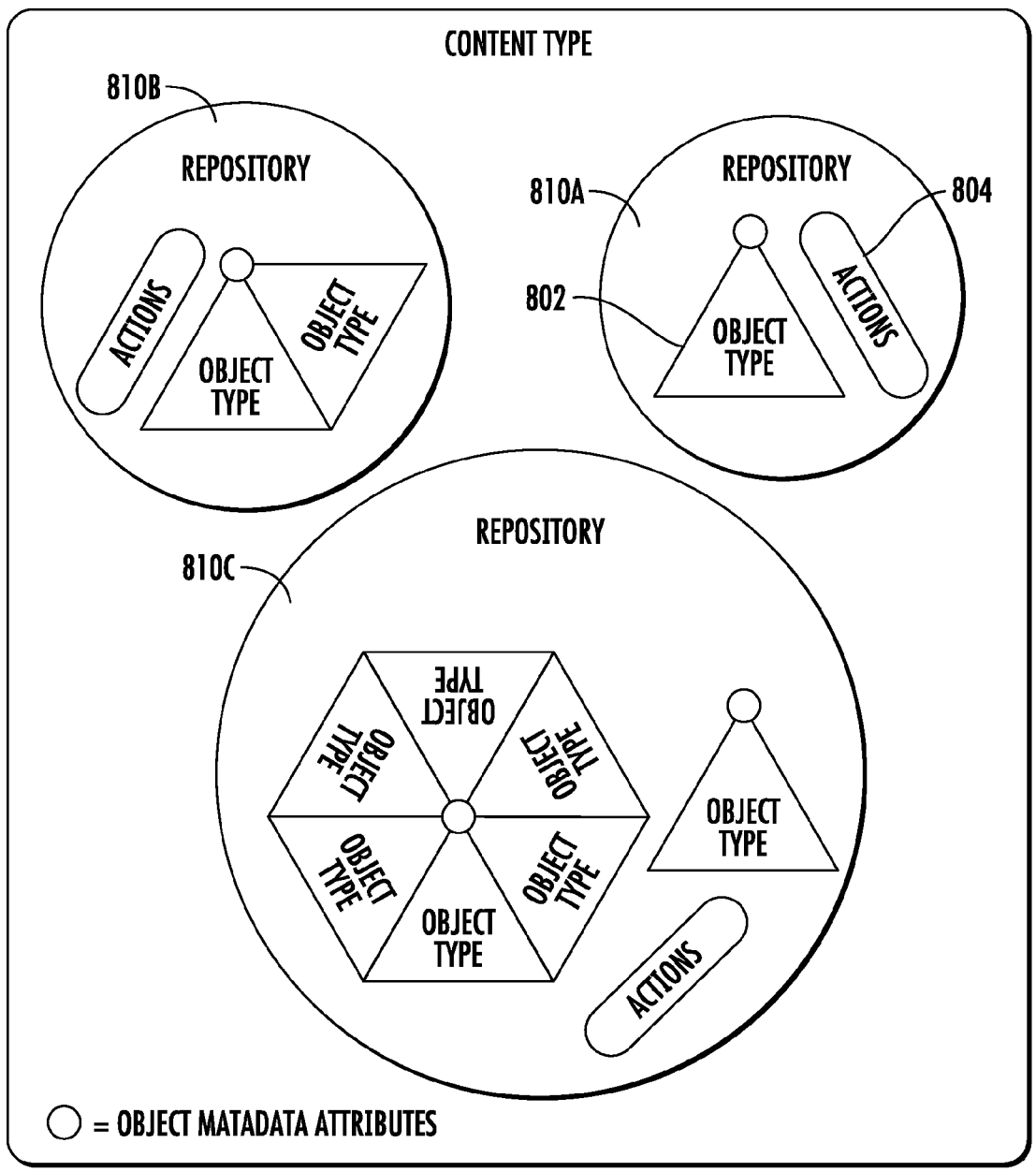
Figure 8B:
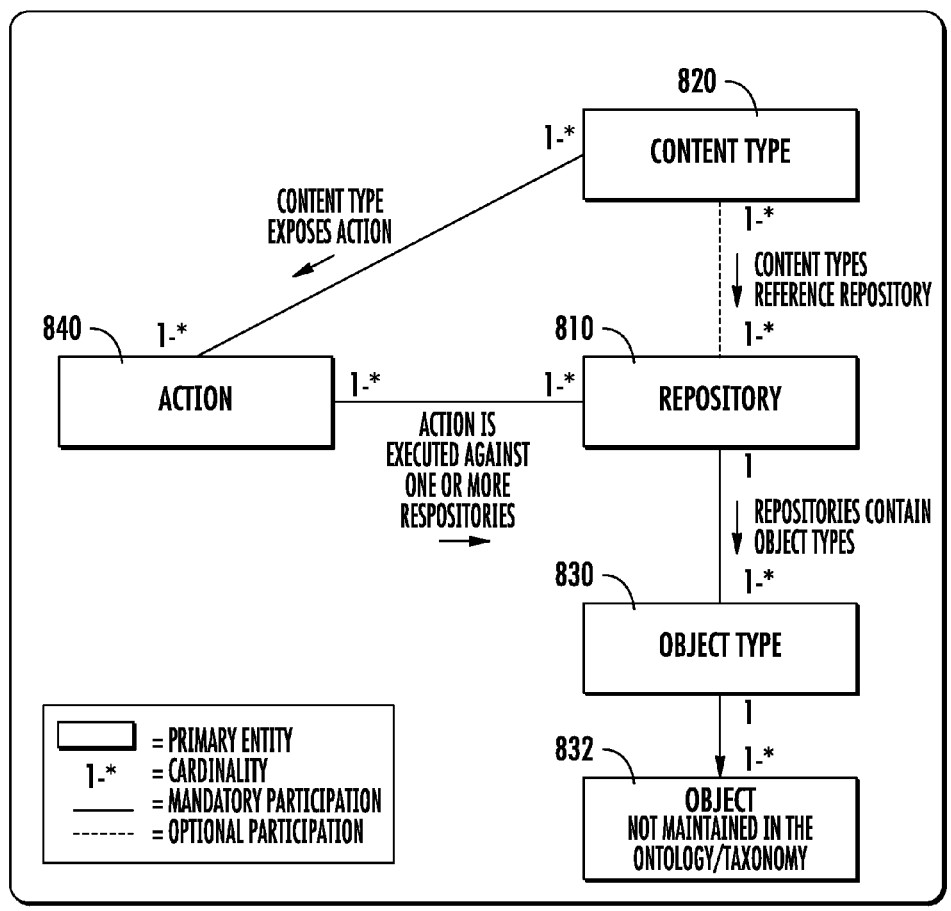
Figure 9:
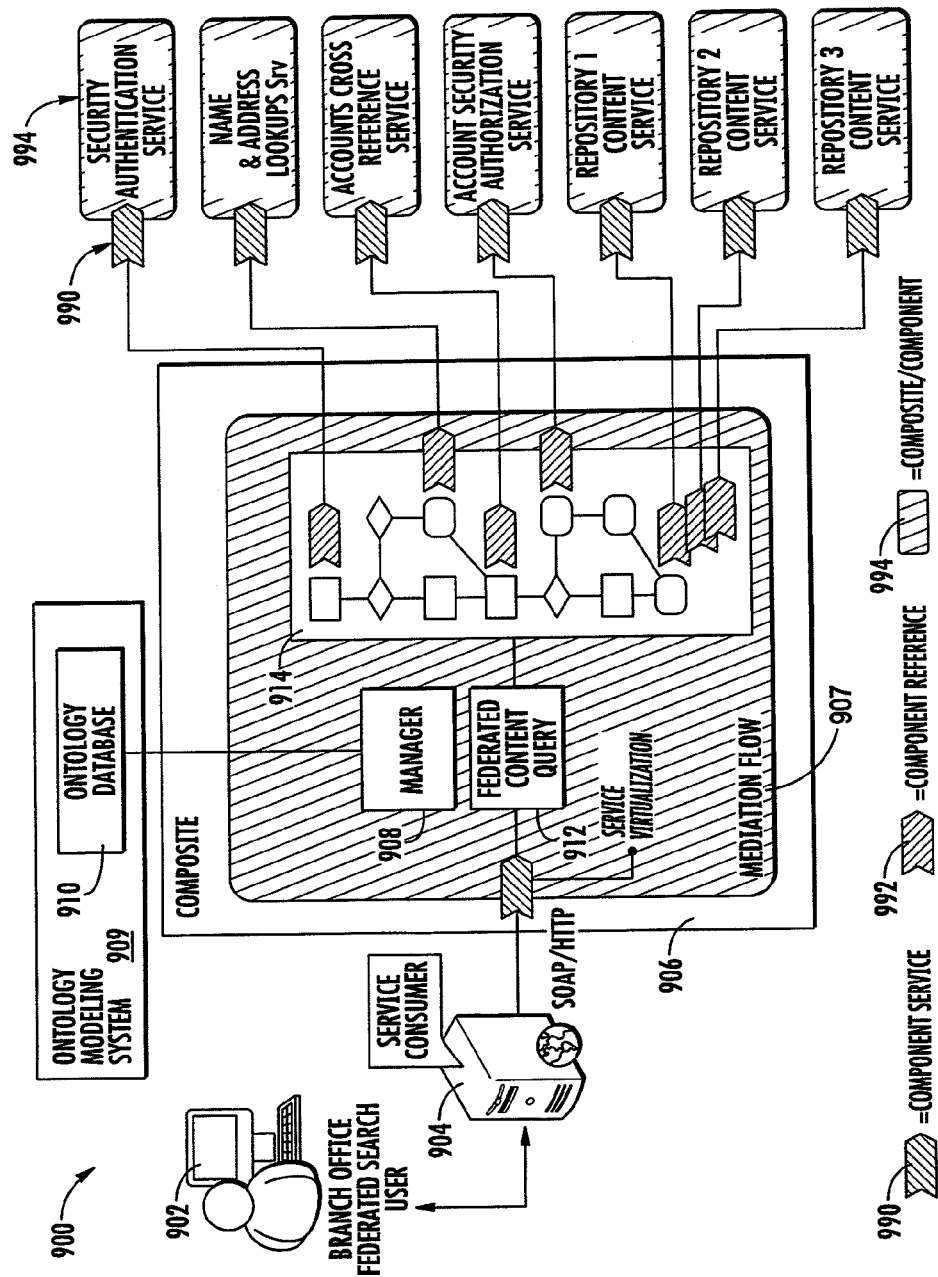
Figure 10A:
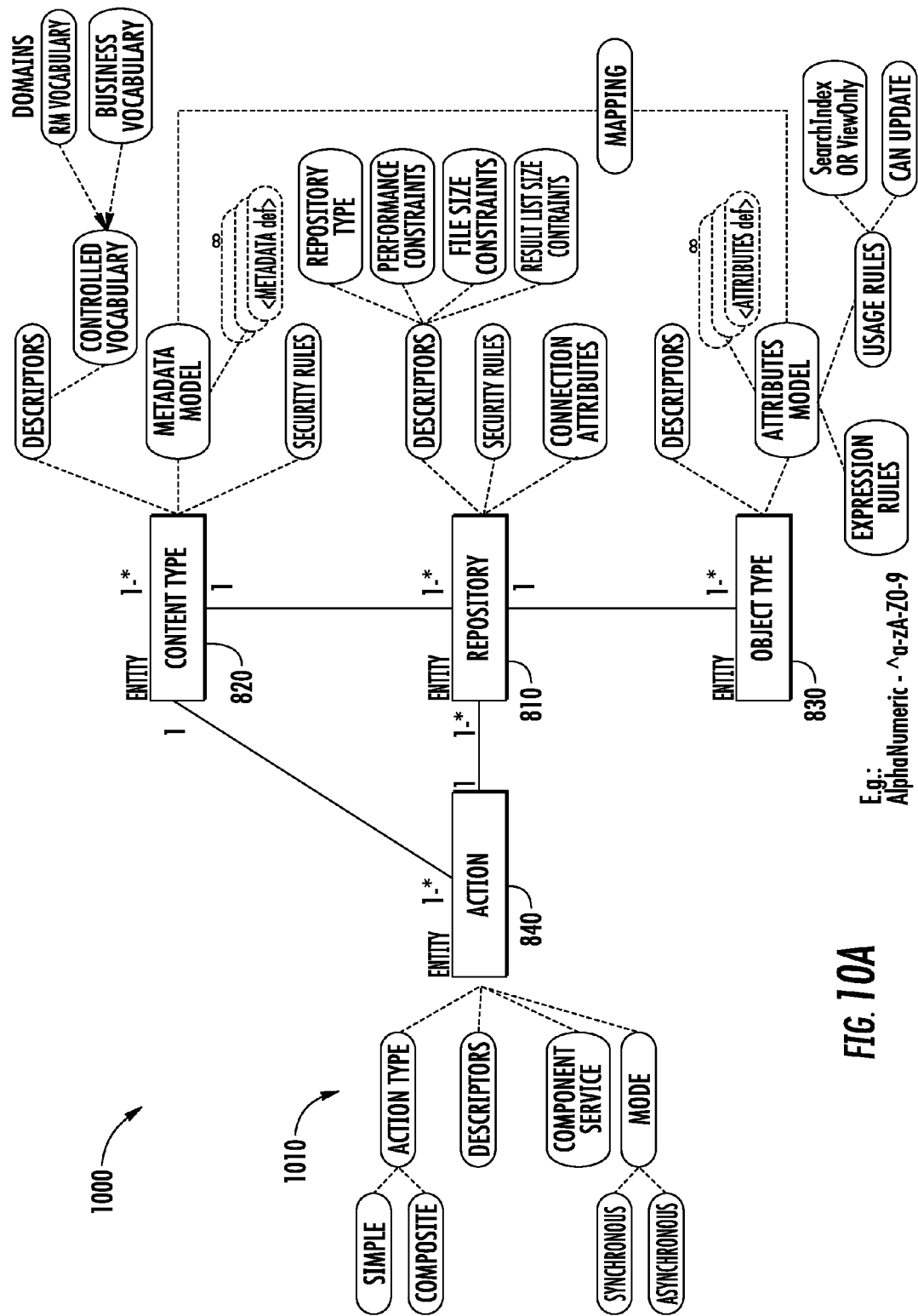
Figure 10B:
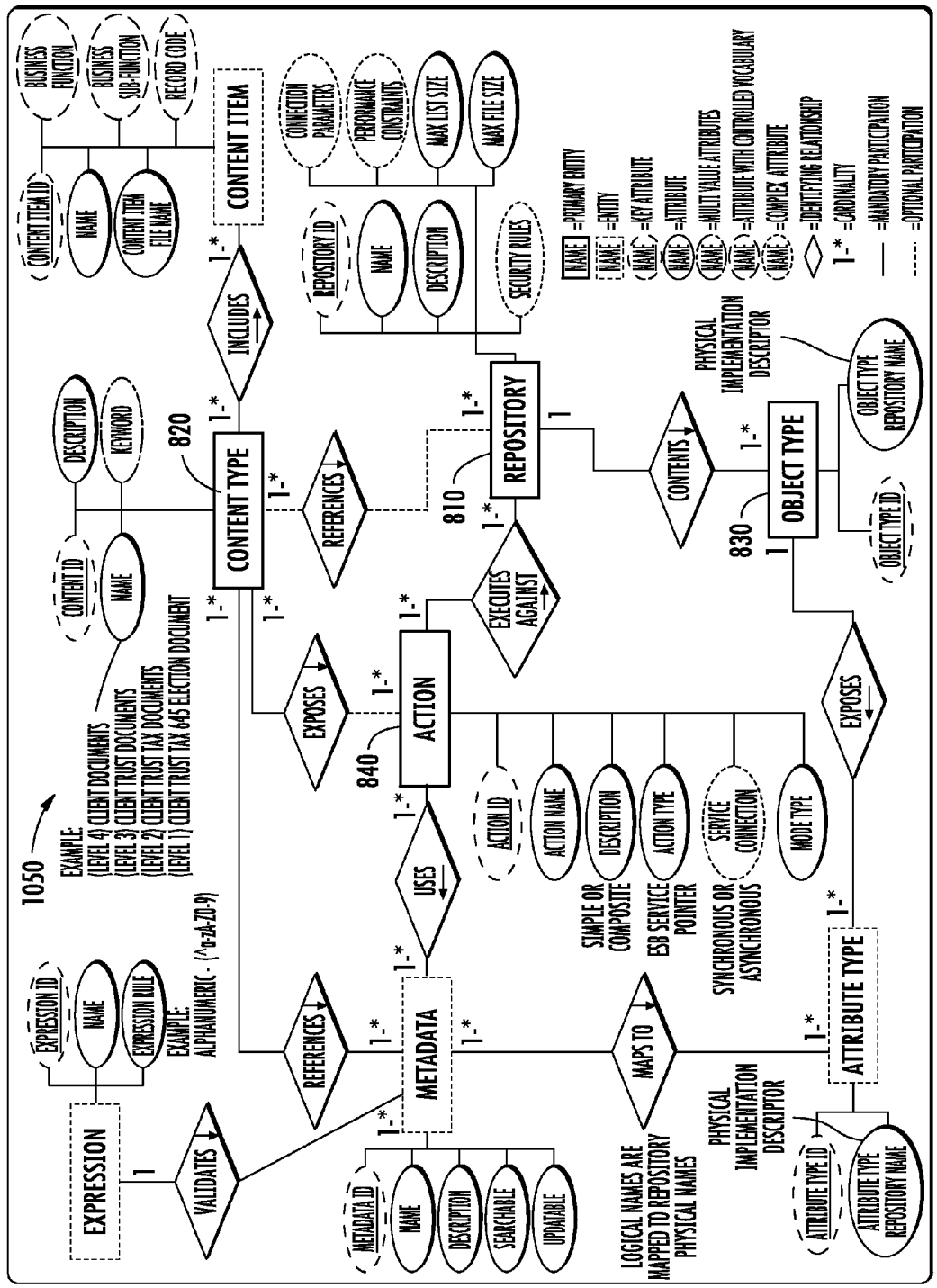
Figure 12A:
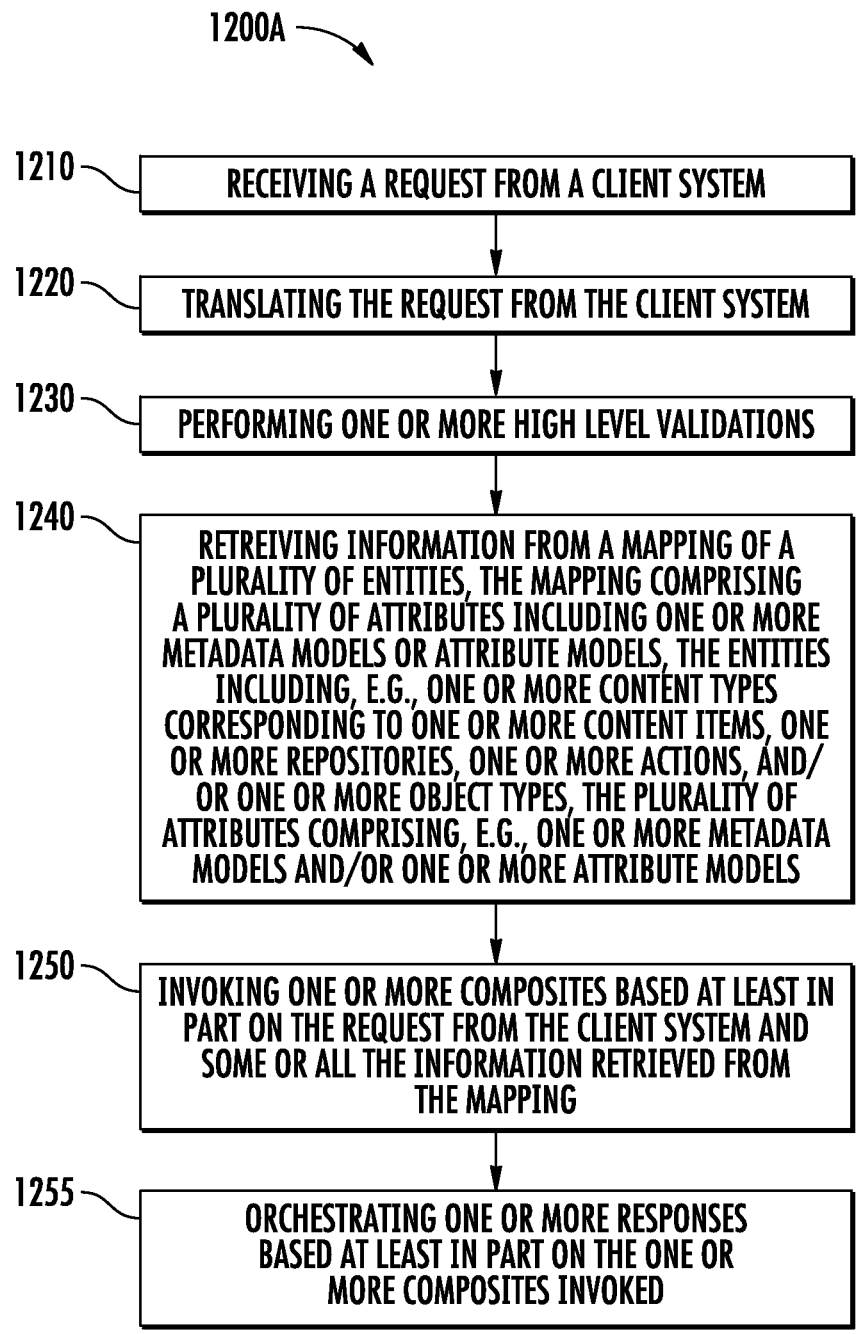
Figure 12B:
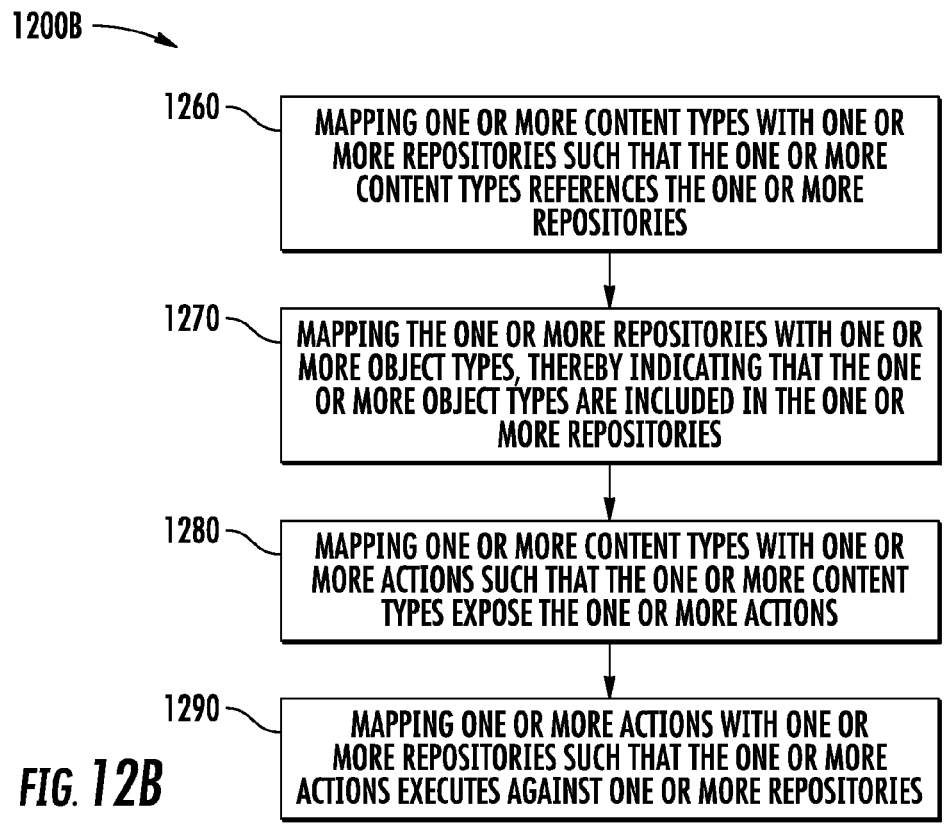
Figure 12C:
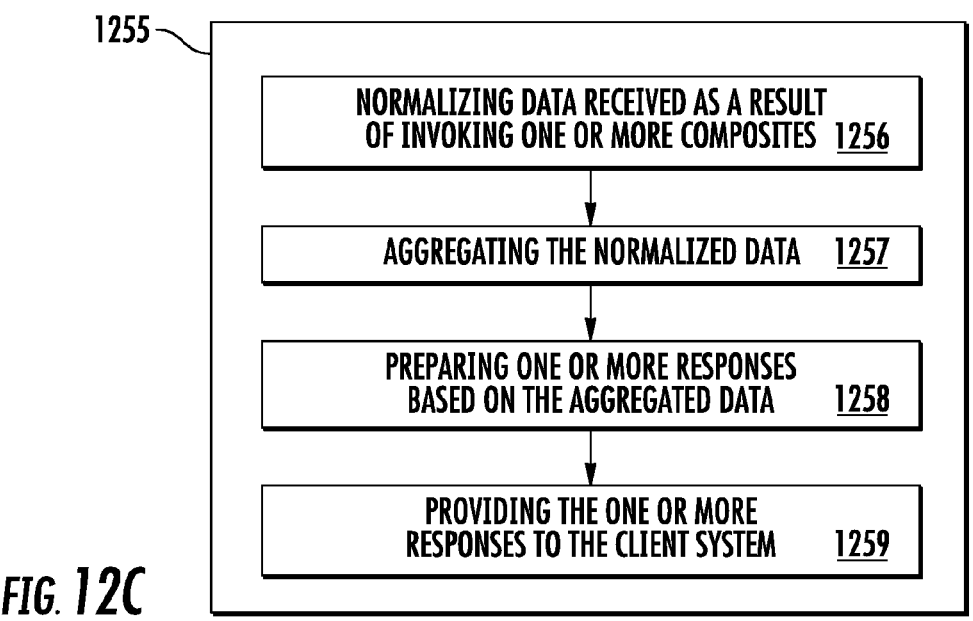
Figure 13A:
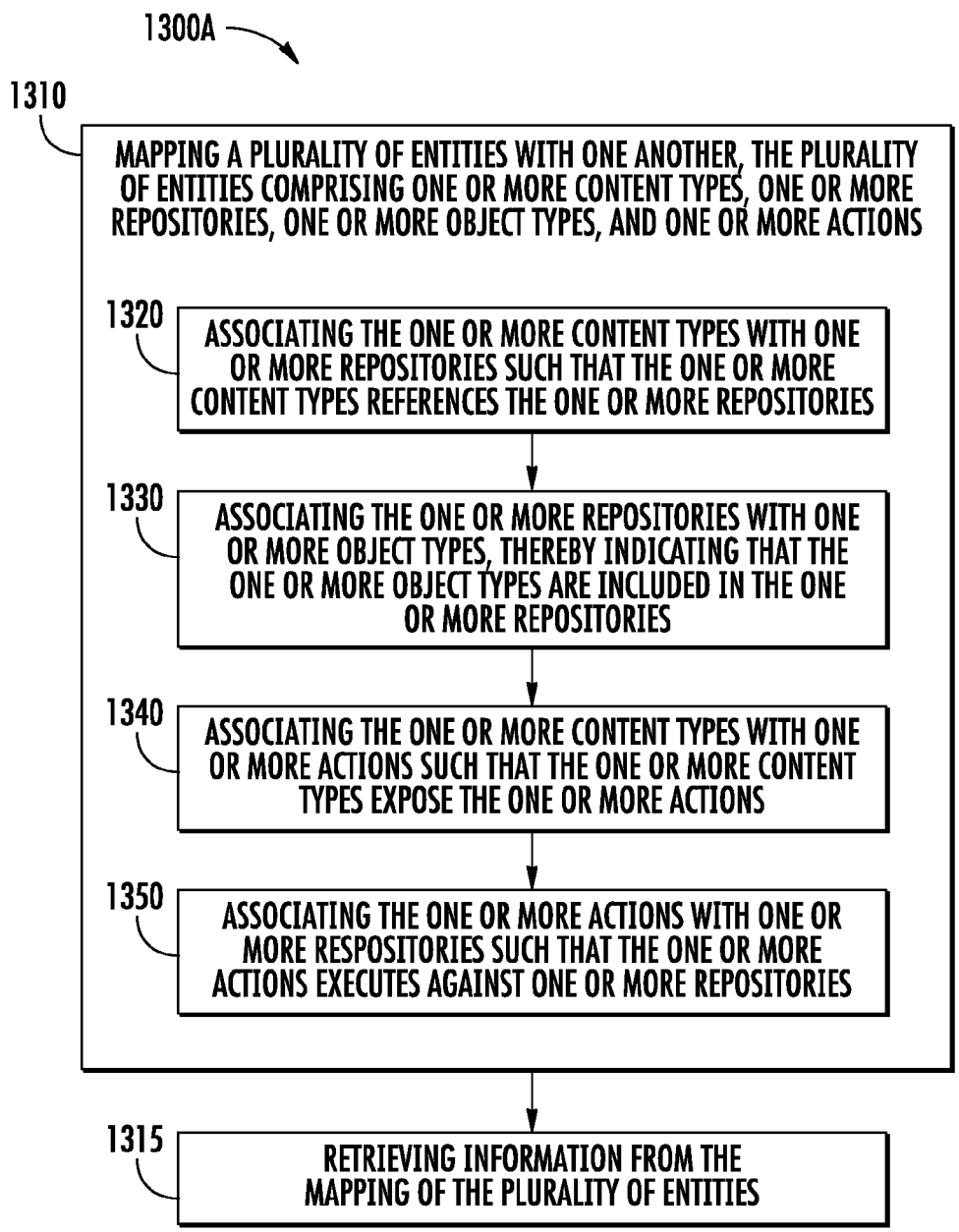
Figure 13B:
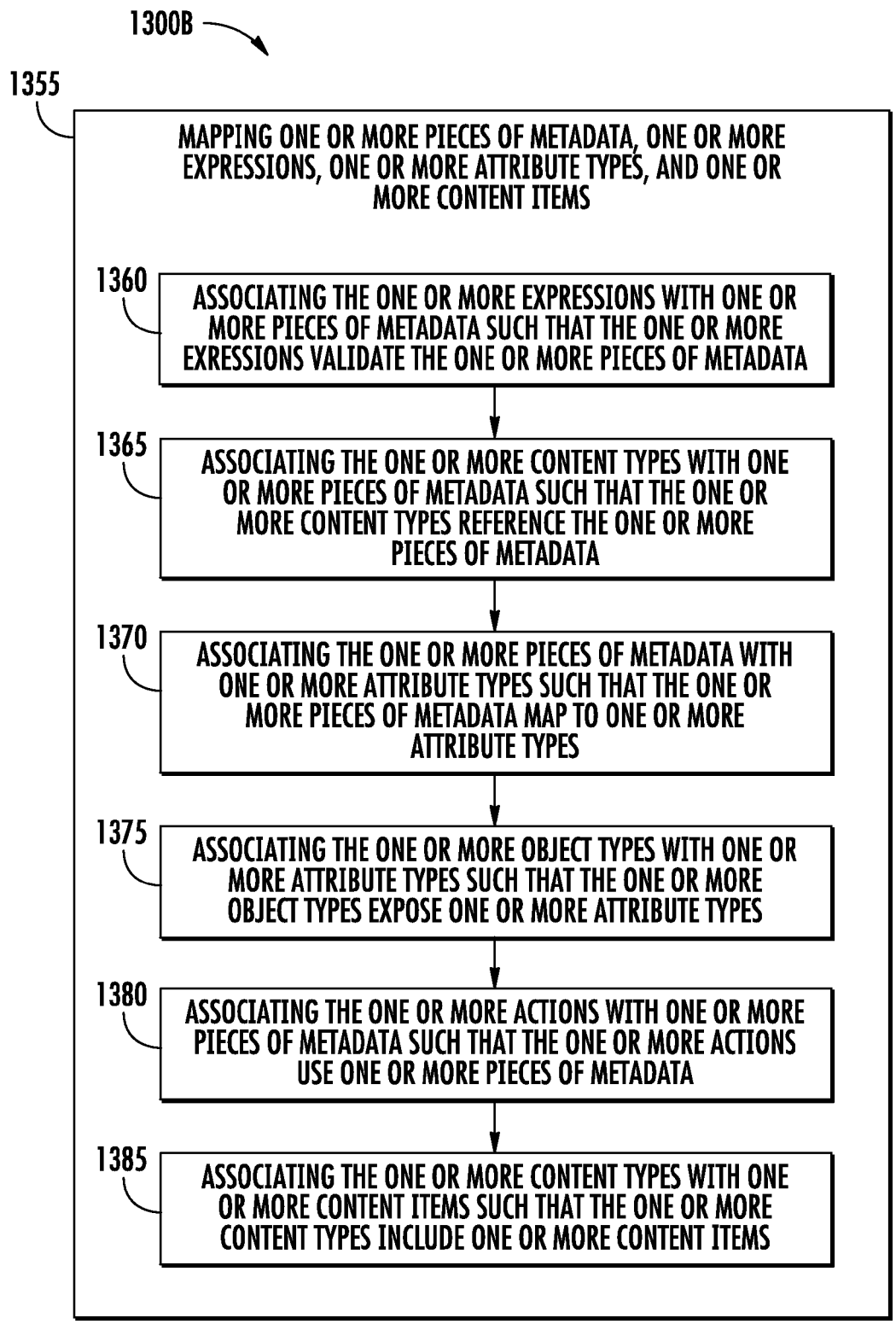
Figure 14A:
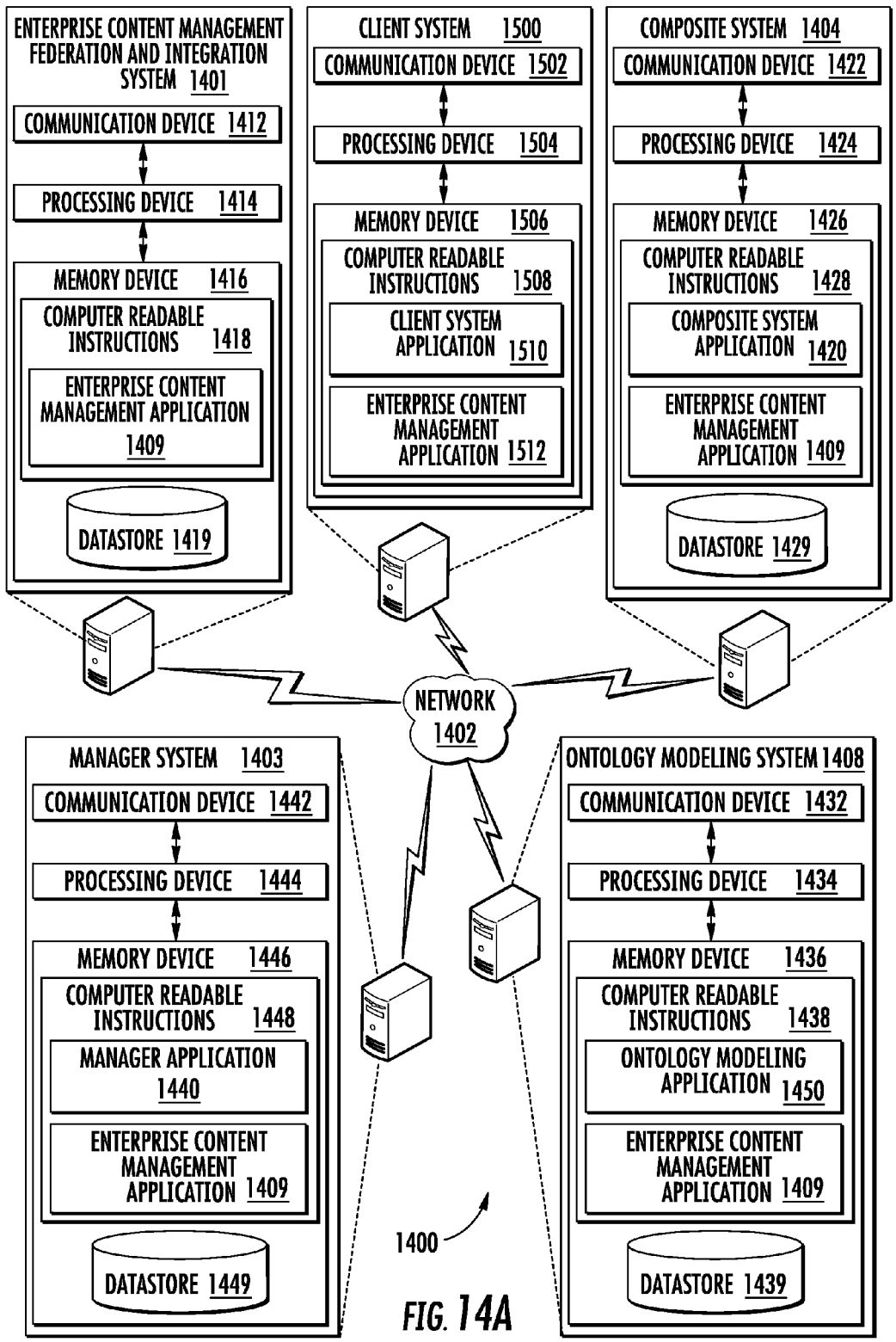
Figure 14B:
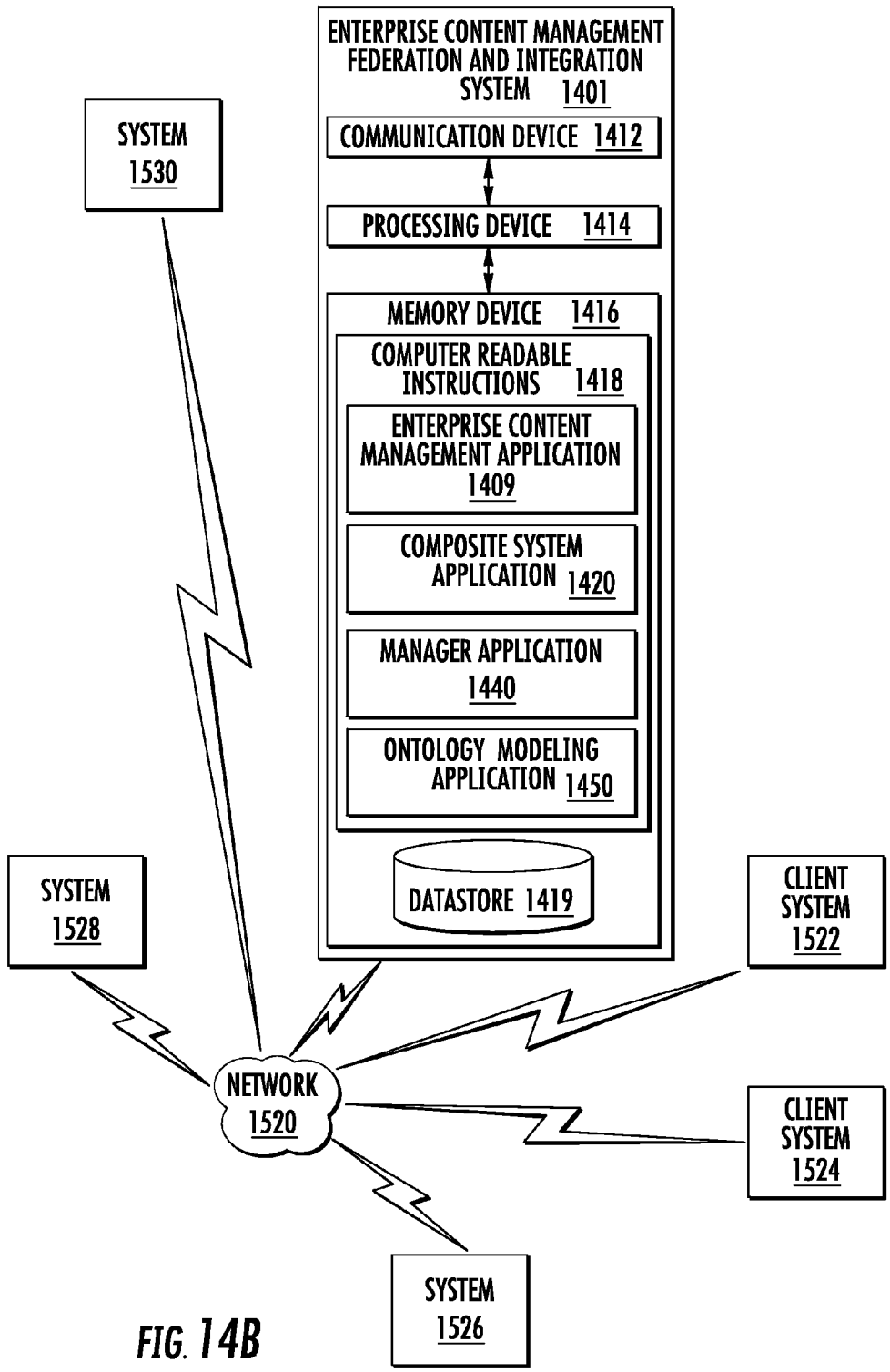

Having thus described embodiments of the invention in general terms, reference will now be made to the accompanying drawings, wherein:

FIGS. 1A and 1B are block diagrams illustrating an enterprise content management system 100 according to embodiments of the invention;

FIGS. 2 and 3 are block diagrams illustrating examples of applications having different repository, database, and other information sources according to embodiments of the invention;

FIG. 4 is a diagram illustrating different types of content and data stores and/or repositories according to embodiments of the invention;

FIGS. 5A and 5B are block diagrams illustrating workflows of multiple services according to embodiments of the invention;

FIG. 6 is a block diagram illustrating a system according to embodiments of the invention;

FIGS. 7A-7E are diagrams illustrating a reference architecture according to embodiments of the invention;

FIG. 8A is a diagram illustrating content ontology methodology according to embodiments of the invention;

FIG. 8B is a diagram illustrating an ontology entity-relationship model according to embodiments of the invention;

FIG. 9 is a diagram illustrating one example ECM system according to embodiments of the invention;

FIGS. 10A and 10B are more complex diagrams illustrating an ontology entity-relationship model according to embodiments of the invention;

FIGS. 11A-11D are block diagrams illustrating an example implementation of the ECM system according to embodiments of the invention;

FIGS. 12A, 12B, 12C, 13A, and 13B are flowcharts illustrating methods for enterprise content management according to embodiments of the invention; and FIGS. 14A and 14B are block diagrams illustrating an enterprise content management environment and an enterprise content management federation and integration system according to embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the present invention address the above needs and/or achieve other advantages by providing methods, computer program products and enterprise content management systems for integrating a plurality of applications and federating information. The systems receive, by a composite system, a request from a client system. The system then translates, by a manager system, the request from the client system. The manager system performs one or more high level validations and retrieves information from a mapping stored by an ontology modeling system, a plurality of content types, repositories, actions and object types based at least in part on a plurality of attributes including one or more metadata models or attribute models. The manager system then invokes one or more composites based at least in part on the request from the client system.

Referring now to both FIGS. 1A and 1B concurrently, an enterprise content management system 100 is illustrated according to embodiments of the present invention. The system 100 services several different client types 102 such as, for example, various lines of business (LoB), Portal, Aggregators, other Enterprise Systems, and/or commercial off the shelf (COTS) Systems.

Various channels 104 for information and application flow are part of the system in various embodiments. For example, in some embodiments, the system functions across one or more intranets and/or the Internet. In various embodiments, a user accesses the system via computing device such as a desktop computer or mobile device, which in some embodiments, is running a software browser or other type of application configured to access the system. Further, in various embodiments, the system is configured to push information and applications both domestically and internationally. As shown in the illustrated embodiment, various interfaces 110 as discussed above can be used to access the system, such as by utilizing one or more web services and/or COTS components.

The system 100 includes one or more ECM applications 106, which are software programs or computer readable programs stored on a file system such as a memory device and are configured for execution by one or more processors or processing devices of the system 100 in order to provide one or more users access to the system. The ECM applications 106, in various embodiments, include a capture application, a document management application, a discovery application, a records management (RM) application, a web content management (WCM) application, and a workflow application.

The ECM applications 106 are configured, in various embodiments, to call one or more ECM services 112, each having one or more functional capabilities. An ECM service 112 is a collection of one or more software applications aggregated to perform a defined function or more than one defined function. In some embodiments, some of the ECM applications 106 are closely related with the ECM services 112 such that they carry the same title. In some such cases, the ECM application 106 and the ECM service 112 are correlated such that the ECM application is configured to call the similarly named service for the user to access the functionality of the service. In other embodiments, the ECM applications 106 are configured to call multiple services, bearing similar names or not, in order to achieve the request of the user or in order to perform an automated function and/or achieve an automated goal of the system 100.

The ECM services 112 include, in some embodiments, a transform service 120 configured to transform a document, for example. In another example, the ECM services 112 include a manage service 118 configured for managing documents by, for example, checking in and/or checking out a document for editing, deleting, reclassifying, redacting, and manipulating a version. The ECM services 112, in another example, include an access service 116 configured for accessing a document, performing a full-text search, printing the document, and the like. One typical ECM service is the capture service 114, which is involved to a great extent both during initialization of a new ECM system as well as in continually updating the ECM system with additional content and data. The capture service 114, in some embodiments, includes functionalities such as scanning, importing, character recognition, indexing, enhancing and storing, all of which, for example, can be applied to a document.

As another example, the ECM services include a web content management (WCM) service 132 configured for managing one or more intranet or Internet pages. The web content management service 132 refers to a content management solution configured to manage web pages and/or web page sections, available via the Internet, one or more intranets or both. In some embodiments of the WCM service 132, its functionality includes authoring content of a page, previewing the page, and publishing the content to an intranet and/or the Internet.

As another example, a records management (RM) service 122 is a content management solution configured for, in some embodiments, managing records of an organization from the time they are created up to their eventual disposal. The records management service 122 is primarily concerned with maintaining evidence of an organization's activities. In some embodiments, rules are applied using the RM service 122 that dictate management of records such as, for example, rules indicating duration of storable for particular categories of documents. In one example, a document or set of documents has been earmarked for deletion after ten years of storage on the system, and the RM service 122 is configured for ensuring the proper rules are in place to remove the earmarked documents at the end of the live period.

As another example, a business process management (BPM) 124 service is a management solution configured for modeling, deployment and/or management of mission-critical business processes spanning multiple enterprise applications in some embodiments. Business activity monitoring (BAM) is part of the BPM service 124 and is a reporting functionality for aiding in monitoring of business activities as they are implemented in computer systems. As another example, an e-form service 126 manages e-forms, such as fillable portable document format (PDF) forms and the like. This service, in some embodiments, provides automation to otherwise paper-filled processes. In other words, this service assists in converting some or all areas or lines of business of an organization to paperless operation.

Other ECM services, for example, include an XML store and retrieve service 146 configured to manage XML formatted files such as documents. An enterprise search service 128, for example, is similar to a widely used Internet searching engine, as it searches in a similar fashion to a full-text search of the content stored by the system, but also searches, in some instances, content and data presented on the Internet and on various other databases. Another service of some embodiments, is a digital asset management service 140 configured for managing information regarding authoring of content, rights management with regard to content, and the like. Another service of some embodiments is a dynamic content creation service 138, which is configured for smart content creation. For example, when a new client letter is desired, the dynamic content creation service is configured to retrieve necessary information regarding the client from one or more databases as well as many other variables coming from one or more databases. In some embodiments, the dynamic content creation service 138 collaborates with the RM service 122 in order to store created content appropriately.

Another service of some embodiments is the taxonomy service 136, which is configured for classifying content based on content types and/or creating a hierarchy in order for the system to know how to find content quickly. The RM service 122 collaborates with the taxonomy service 136 in some embodiments in order to manage records effectively. In other words, the taxonomy service 136 provides a hierarchically ordered list of terminology approved for tagging or categorizing a set of content. This taxonomy is also often exposed in a search interface to form the framework for a navigated search. In some embodiments, a record code is assigned based on business purpose or business group or line of business in order to classify content.

Another service of some embodiments is the control service 130, which includes in some embodiments, authenticating and authorizing and logging functionality. Another service of some embodiments is the findability service 134, which orchestrates requests and aggregates responses. Yet another service of some embodiments is the digital rights management service 142, which manages the digital rights of content and data. Finally, another service of some embodiments is the collaboration service 144, which assists multiple client or lines of business and/or multiple applications and/or services to interact to achieve one or more common goals.

The ECM services 112 are tied to and can retrieve content and/or data as needed from a set of content and data repositories 108, which, in the embodiment shown, include several repositories. "Content" refers to the material, including, for example, text, audio aspects and visual aspects that constitute a publication, document, presentation, file or other carrier of content. "Data" refers to groups of information that represent the qualitative and/or quantitative attributes of a variable or set of variables. Typically, data are viewed as the lowest level of abstraction from which information and knowledge are derived. Of course, in various embodiments of the system 100 an infinite number of different combinations of client types, channels, ECM applications, interfaces, ECM services and content and data repositories are envisioned. In some embodiments, one or more of the ECM applications 106 are stored external to the system and are accessed by the system and executed by a processor of the system. In other embodiments, the system requests an exterior system to run the application and the present system only the output.

In summary, the system 100 includes a significant collection of functionality in various embodiments reaching much farther than simple content/data collection and storing as well as providing ever-expanding channels and interface types. In various embodiments of the system 100, numerous variations of the requirements for particular clients necessitate flexibility in the potential ECM services to be provided as well as the other components of the system.

In many instances, content and data are stored in different formats using different schema organizations, therefore creating difficulties in proper and efficient function of ECM systems. For example, documents pertaining to a bank account could be stored based upon a reference having an account number including a dash, while in other systems or repositories the same content and/or data and/or, in some instances, the same underlying target, that is, the bank account in this example, is identified using a different standard. In another system, for example, the standard for identifying the account includes an account number without a dash.

Referring now to FIG. 2, various applications, such as Application 210, Application 220 and Application 230, require different inputs. For example, Application 210 requires access to one or more repositories, as represented by block 212, access to one or more databases, as represented by block 214, and requires access to one or more legacy applications, as represented by block 216. As another example, Application 220 only requires access to one or more databases 222, and Application 230 only requires access to one or more repositories 232 and one or more databases 234.

These example scenarios demonstrate the difficulty that for each application, each application and/or legacy application, as well as each repository and/or database, must be understood and hardwired for each application, such as Application 210. Historically, the analytical and technical effort for doing so is high, and in many cases, the programming implementing solutions is focused on simple capabilities. Once such modification programming is applied, connections among the pieces of the system can be fragile and costly to maintain. Hence, systems implementing such cumbersome and difficult solutions do not provide interoperability, extensibility, and discoverability capabilities needed to effectively share content and metadata efficiently. Metadata is explicitly defined labels for structuring content that describes any document or file regardless of the native format. An example of metadata used above is an account number, which can be formatted differently by different organizations, systems, or other entities dealing with content associated with the account number. In order to have a truly integrated solution, the system must understand the variations in metadata across all its input systems, services, and repositories. Another example is a customer's name and the ways which it is stored by various systems. In one example, the customer's name was stored in one format before a certain year, such as 1992, and thereafter it was stored in another format. In some instances, legacy ECM systems or systems having less capable integration solutions, relied on a person with first-hand knowledge of the legacy systems and their metadata models, API and the like in order to integrate systems. In some instances, a person performed functions such as manually implementing conversion information in the midst of otherwise automated procedures such as searching for specific (poorly integrated) content.

Referring now to FIG. 3, these problems can be further confounding because an ECM system typically provides different home grown and/or vendor solutions for a particular organization. In a case of a merger of organizations, many varying vendor solutions to such problems may be encountered and must be eliminated and the applications, application programming interfaces (API), metadata and functionalities integrated properly. As FIG. 3 illustrates, each application, such as Application 310 has its own interface 312, its own metadata 314 and its own functionality 316. As another example, Application 320 has its own interface 322, metadata 324 and functionality 326. Finally, Application 330 has its own interfaces 332, metadata 334 and functionality 336.

Referring now to FIG. 4, a diagram illustrating relationships among types of content and data is illustrated. A metadata model or metadata system is a model or system where the metadata is stored. In some embodiments of an ECM system, metadata for content is stored in a proximate location to the content itself. In other words, the metadata for a particular piece of content stored on a particular repository is also stored in an easily accessible location on the same repository. This allows a service, for example, that is searching for the content via the metadata to be able to locate the content. In various situations, however, existing ECM systems store metadata separately from content, and the fact that metadata across platforms, services, applications, systems, etc. is different for similar, identical or related content complicates location of the appropriate content further. Hence, sophisticated unstructured and semi-structured content discovery functionality typically requires structured data lookups and historical metadata variation normalization. Also, unstructured and semi-structured content types typically require different functional capabilities and, therefore, are normally implemented using different ECM software, application or service solutions.

As shown in FIG. 4, unstructured content stores 410 (repositories) include an unstructured format that supports a capture service 114 and collaboration service 144, for example. In various embodiments, the unstructured content includes a rich ECM functional and metadata model and provides a long term historical view of content. Examples of unstructured content include scanned documents, audio, video, word processing documents and the like. Semi-structured content stores 420 (repositories) include content having some structured elements. In other words the content includes formatting from which data and information can be extracted. Typically, semi-structured content stores are high volume archives that handle high volumes of data. They have limited ECM functional models and provide long term historical views of content. Examples of content stored at a semi-structured content store 430 (repositories) includes statements, checks and other content having data fields. In some embodiments, collocated storage of all the metadata, due to the high volumes of content stored there already, proves very expensive and unworkable in some instances. Structured data stores, for example, databases, store only data and have standard data models in some embodiments. These structured repositories only keep data that is very well defined, and, in some embodiments, content is not stored thereon. In some embodiments, the structured repositories include data organized for easy retrieval, such as by columns and/or row or some other organizational method. In some other embodiments, some structured repositories keep both data that is well defined in addition to content. Metadata is stored in structured stores in some embodiments.

For example, in one application, before retrieving content, such as a document, the service retrieving the content must perform a lookup command. For example, the service is looking for a particular statement related to a bank account. However, the bank account number is stored in different formats. That is, the metadata for the content is arranged different across disparate systems. For example, there is a legacy account number, a merged bank account number, and a current account number format. Thus, the ECM system, in order to effectively and efficiently lookup the statement, includes intelligence configured for recognizing different metadata models, such as different account number formats in the above example, in order to locate effectively the desired content.

In some ECM systems, the service seeks out a documenting system and provides known indexes in order to locate the desired content. An index is a systematically arranged list in a computerized system, such as an ECM system, for representing content in order to enhance content retrieval speed by governing applications and/or services. In one example, the service could locate specific pieces of content, such as the account opening documents of a client. However, if the service was seeking all the content related to a specific client, for example, the service would be unable to do so in an efficient manner. This is because, in legacy ECM systems, the content for the client is spread over multiple repositories having multiple metadata models and the metadata for the content is typically stored in multiple documenting systems. Hence, in order to discover all content related to one specific client, for example, a service must access the location of the appropriate metadata, knowing the metadata model or format in order to find the appropriate metadata for the content, and then, using the metadata, go to the appropriate repository in order to retrieve the content.

In another example, the service must first go to multiple structured databases to enter the client's first and last name in order to retrieve the multiple account numbers associated with that client. Once the account numbers have been located, the service must be aware that the account numbers are stored in various formats across various systems as discussed above.

For example, in one application, after the account number is known, the service goes to a repository, such as a statement and check repository to retrieve all the statements and checks associated with the account number. In order to retrieve account opening documents, the service must look in other system, and to retrieve other documents, the service must look at other systems. In legacy systems, this functionality was typically performed by a knowledgeable user. That is, the ECM system was not automated to perform these various steps, but rather, the user was required to know where to look for particular metadata and which repositories should be searched for various types of content and the like.

As shown in FIG. 5A, a workflow of multiple services 512 or a service oriented architecture is shown. Universal adoption of Web Services, Service-Oriented Architectures (SOA), Enterprise Service Bus (ESB) and Business Process Management (BPM) standards and technologies enables development of interoperable solutions among disparate pieces of software, such as applications and services, regardless of the network architecture, platform, or programming language. Thus, by calling one particular service in such an ECM system, multiple services are performed in a workflow pattern so that various steps necessary to achieve the desired result are performed by the proper services. For example, if a lookup function is called by a database service, multiple other services are called to achieve the lookup. For example, the first service called is a legacy line of business service to cross-validate the lookup. Then, the flow goes to one or more databases to retrieve the data. Some other services, such as client validation services are also called to validate the client's credentials. In some embodiments, this higher level capability is enabled by calling multiple services in such a workflow.

As different services are called, however, the services or applications have different interfaces and/or metadata as discussed above. Thus, the ECM system must understand the parameters such as interface and metadata required by the various services being called. The ECM system therefore aggregates the various services while recognizing what is required by the services and recognizing what outputs the services will be giving so that the workflow of services progresses seamlessly to achieve the desired goal. This aggregation is referred to as "orchestration."

Referring now to FIG. 5B, the ECM system orchestrates services 512 and aggregates data as represented by block 514. Such orchestration of the services, for example, simplifies the required effort of an end user of the system, which, in some instances prevents the user from having to recognize many different repositories and systems required to perform a particular task, perform validation protocols for each repository or system, and then request particular functions from each. Complete content management work processes allow orchestration of ECM system activities accessing multiple systems, content repositories and databases. When this functionality is combined with complete content ontology, as represented by block 516, that is an assembly of concepts in which all pertinent relationships that might exist between and among the concepts is explicitly mapped, the ECM system can provide a robust content aggregation, federation and integration framework. In some other embodiments, less than all the pertinent relationships that might exist between and among the concepts are explicitly mapped. Content aggregation refers to inclusion or clustering models for heterogeneous content stores, content types and metadata models. An ontology may include one or more taxonomies and may include features of one or more taxonomies, such as well-defined content categorization. For example, the format of the account numbers must be understood by the system. In a sense, the ontology system includes a comprehensive set of rules applied to each target system or target database system being called. Also, the ontology model 516 includes a comprehensive set of rules for performing each particular service and functionality. The ontology model 516, in other words, removes the necessity for a dedicated content federation layer within the system. The ECM system of the present invention, in essence, has an ontology model 516 that combines functionality historically found within a dedicated content federation layer or system and the ontology model 516 explicitly maps all potential relationships among the various components of the system.

For example, a legacy federation layer maps each target repository from which data will be retrieved, but a database lookup cannot be performed. If you are performing a lookup function, then an attribute matching an account number must be mapped for each repository. Then, the legacy solution sends a query for each account number and expects something to be returned. Hence, it is a simplistic solution of mapping, sending, and receiving return. These legacy federation layers inherently include upper thresholds of operability. For example, the legacy federation layer does not recognize that one database will take 30 seconds to return data while another database will take 10 minutes to return data. Hence, queries more complex than the simplest queries begin to break down quickly. The present ECM system uses the orchestration of services 514 to overcome these drawbacks.

Referring to FIG. 6, a high level block diagram of an ECM system 600 configured for aggregating content 610 from multiple ECM repositories is illustrated. The content aggregation 610 includes both federation 620 of unstructured, semi-structure and structured stores, thereby aggregating data 630, as well as integration 650 of ECM services/applications through service orchestration 660 discussed above. The system 600 includes ontology modeling systems, as discussed above, taxonomy systems, and/or vocabulary systems (collectively 640) in order to achieve effective results. Vocabulary is a controlled list of terms that have been enumerated explicitly. All terms in a controlled vocabulary have an unambiguous, non-redundant definition. In that regard, using a controlled vocabulary within the ontology modeling system allows the system to standardize terms. Hence, the system 600 supports a metadata normalization metadata model. The ECM system 600 supports federated searches across all components of the system 600. A federated search is a process of retrieving content either serially or concurrently from multiple targeted sources that are indexed separately and presenting results in a unified display. An index, as mentioned elsewhere herein, refers to a systematically arranged list, which is a representation of content used to improve efficiency and speed with which the content is retrieved by the governing systems. The system 600 further supports composite data and content services as well as exposing a structured and extensible application development model. The system 600 further provides robust fault management capabilities.

Figure 7A:
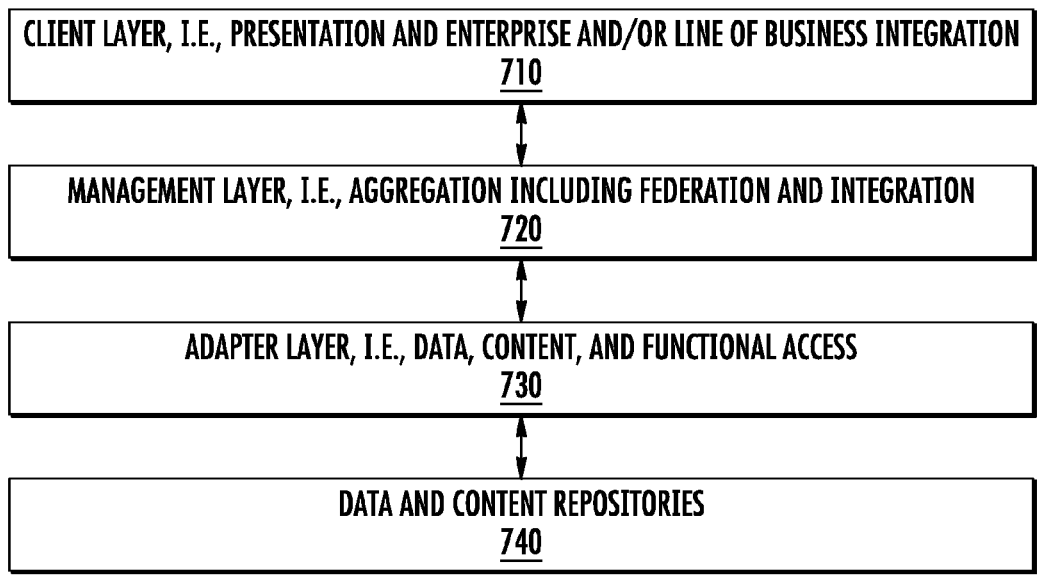

Referring now to FIG. 7A, a block diagram illustrating an ECM system reference architecture 700 according to an embodiment of the invention is shown. First, a client layer 710 integrates the presentation of the system to a client, such as an enterprise and/or line of business within the enterprise. Next, a management layer 720 aggregates federation and integration functionalities. Next, an adapter layer 730 provides access to data, content, and functionality. Finally, a data and repository layer 740 includes stored data and content.

Figure 7B:
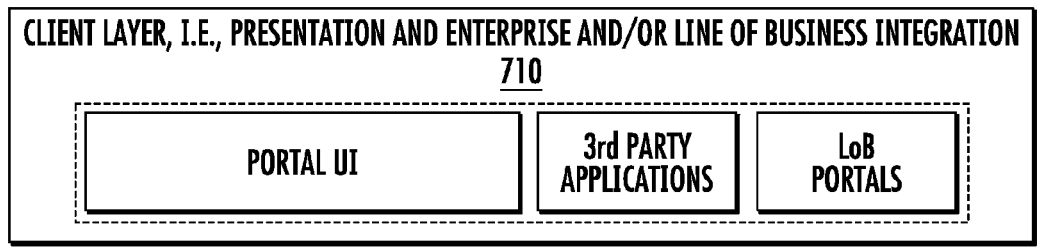

Referring now to FIG. 7B, the client layer 710 is shown in greater detail. In various embodiments, the client layer includes one or more of a portal user interface, one or more third party applications, and one or more line of business portals. The portal user interface includes dynamic content types selection and synchronous and asynchronous modes of operation. The third party applications and line of business portals provide integrating applications and federating information services, such as allowing an end user to request various functions of the system to be performed.

Figure 7C:
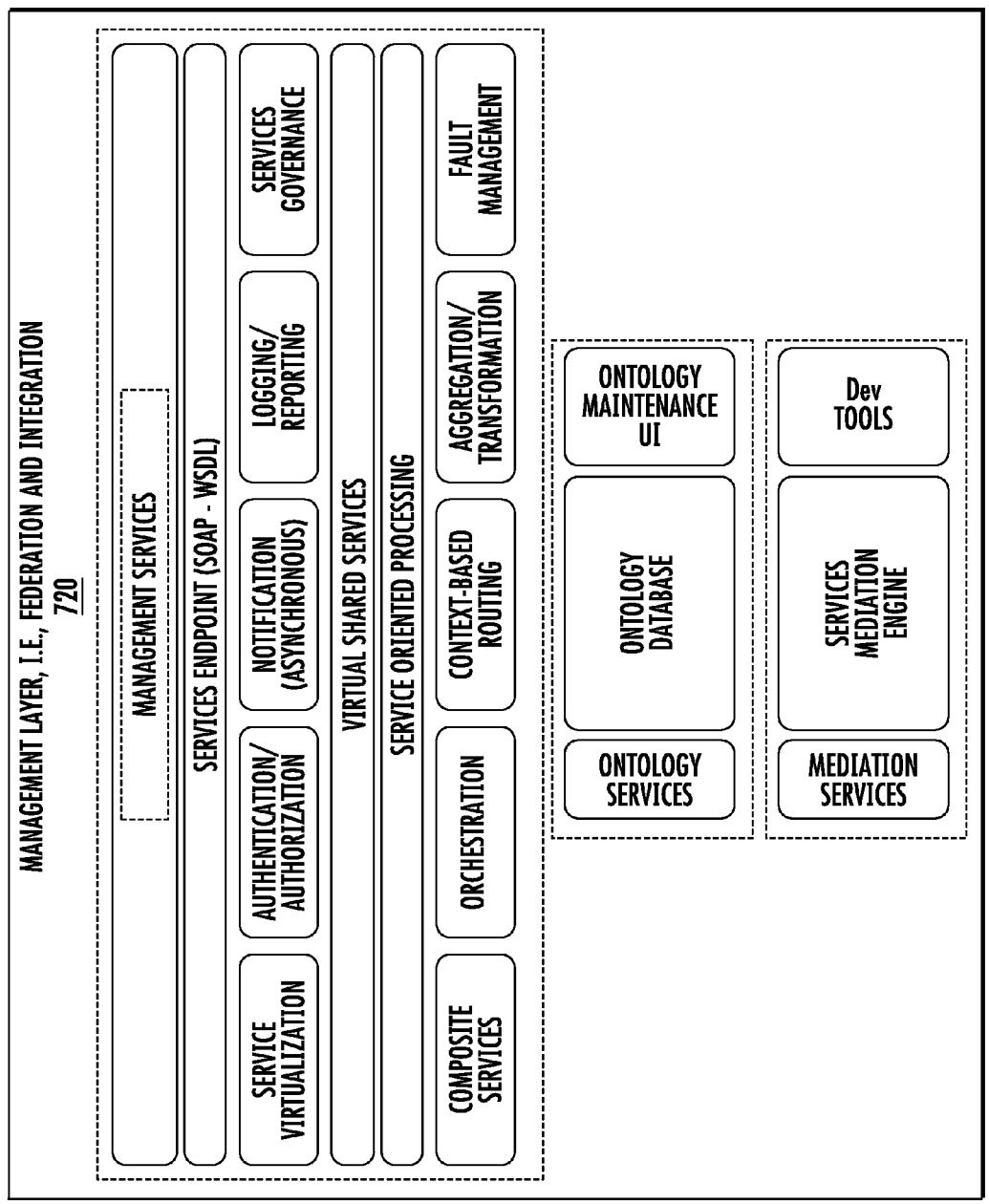

Referring now to FIG. 7C, the management layer 720 is shown in greater detail. For comparative purposes, in legacy systems, this management layer 720 was merely a federation layer having much lower functionality. Such federation systems, as discussed above, were only capable of minimally complicated tasks, whereas the present management layer is configured for aggregating numerous services through ontology services such as by using an ontology database with an ontology model as well as a mediation service. The ontology modeling system, in various embodiments, includes one or more of a repositories registry, a services registry, a content types catalog, a content type attributes, object type attributes, attributes relationships, as well as repository, object types and services constraints information. In some embodiments, the system also includes an ontology maintenance user interface for interacting with the ontology services and the ontology modeling system. The mediation services system includes, in various embodiments one or more of service visualization capabilities, services composition, orchestration (discussed above), transformation, aggregation choreography and fault management. Transformation, in data and content management, refers to tools configured to normalize or otherwise systematically change data and/or content.

The management layer also includes services endpoint (such as simple object access protocol (SOAP) and/or web server description language (WSDL)), service virtualization, authentication/authorization, notification (asynchronous), logging/reporting, and services governance. The management layer further includes a virtual shared services system configured for sharing services across various platforms and/or systems without such platforms and/or systems having such services available locally. The management layer also includes service oriented processing such as composite services, orchestration, context-based routing, aggregation/transformation, and fault management.

Figure 7D:
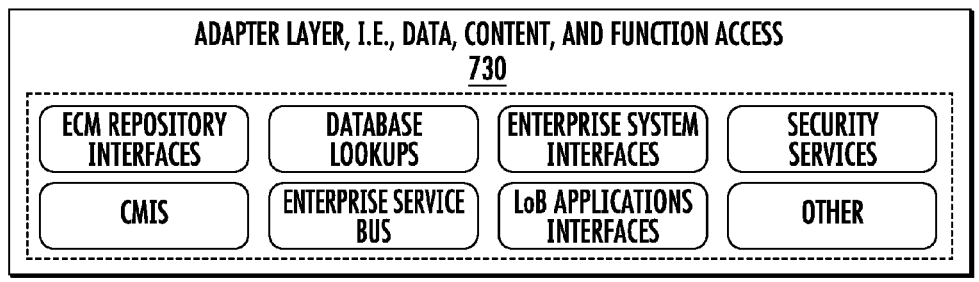

Referring now to FIG. 7D, the adapter layer 730 is shown in greater detail. The adapter layer includes various content store, database and enterprise application access interfaces, such as, for example, the ECM repository interfaces, database lookups, enterprise system interfaces, security services, content management interoperability services (CMIS), enterprise service bus, LoB applications interfaces, and other application interfaces.

Figure 7E:
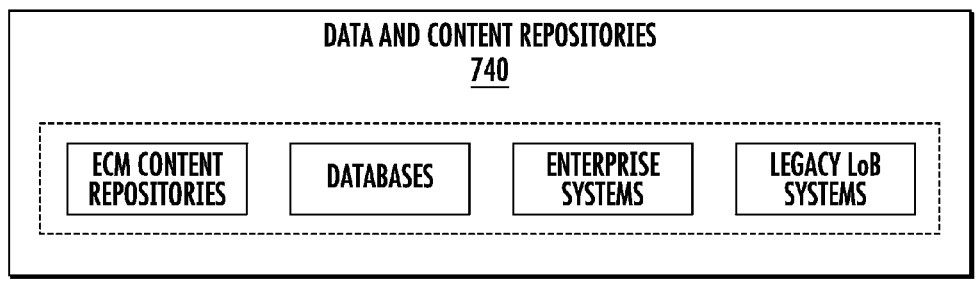

Referring now to FIG. 7E, the data and content repositories layer 740 is shown in greater detail. The repository layer, in various embodiments, includes numerous different combinations of repositories and/or databases as discussed above. For example, in the embodiment shown, the repository layer 740 includes one or more ECM content repositories, databases, enterprise systems, and/or legacy LoB systems.

Referring now to FIGS. 8A and 8B, content types are typically stored across multiple repositories supporting different object models. Each repository has a unique set of actions, such as operations and/or capabilities that it supports. For example, some repositories support a client statement lookup operation. The ontology modeling system understands the peculiarities of each content type, repository 810, action 804 and repository object type 802. The ontology modeling system also supports different access paths to the object types depending on the specific content type and action definition. The ontology modeling system recognizes a particular repository, such as 810A, that has a particular object type 802 having unique metadata models and supported actions 804. As shown in repository 810C, the ontology modeling system supports repositories having multiple object types 802 with similar or identical metadata models.

Referring to FIG. 8B, an entity relationship model as implemented by the ontology modeling system is shown. A content type 820, for example a client statement, an action 840 supported by the ontology modeling system for that content type is a lookup. The client statements are stored in a repository 810 and actions 840 are executed against one or more repositories 810. Repositories, as discussed above, contain one or more object types 830 as well as one or more objects within one or more of the object types 830. The object types are typically defined at the repository level in the ontology modeling system, and therefore, from the client's perspective, the object type is meaningless. An object type refers to the way the content is stored in the repository, for example, an object type called "client letter," "welcome kit," "statement," "trade confirmation" and numerous other types of content. In some embodiments, there is no standard across repositories regarding object types. Typically, in embodiments of the ontology modeling system, the objects 830 themselves are not maintained in the ontology/taxonomy. The content type, in a search could be in one repository, for example, and the object may be in another repository. Once all target repositories are mapped and the specific actions are mapped, then very complex and high level queries can be made. The actions, in simple examples, are query actions, retrieve actions, and the like, and on a more complex level can be combinations of simpler actions and/or more complicated singular actions.

For example, with regard to the one repository shown in FIG. 1A, in one embodiment, the ontology modeling system maps the content into five different object types 830 for one or more design reasons. The content type can be defined as a "client document," and one action that may be defined for client document content types would be search and retrieve. Such an action, when called can, for example, retrieve perhaps forty or fifty different object types across numerous repositories in order to achieve a search and retrieve action on a client document content type 820.

Referring now to FIG. 9, an ECM system 900 is shown according to embodiments of the present invention. A user communicates with the system through an interface 902 in communication with a service consumer system 904. The consumer system 904 communicates with the ECM system 900, which includes one or more composites 906 via some protocol such as SOAP and/or HTTP for example. As shown in the illustration, various component services 990, component references 992, and composite components 994 are included within the mapping of a particular composite and its actions 914. Depending on the particular action, that is, whether it is simple or complex, very few or very many component services, references, and composite components may be involved in the implementation of the specific action 914. A composite 906, as shown, is called from a component service 990, which in some embodiments, is a service virtualization. Once the composite is called, there is a predetermined mapped process flow in order to achieve the desired results. This is referred to as the mediation flow 907. Within the mediation flow 907, a federated content query may be performed as represented by block 912. The federated content query is managed by a manager system 908 that retrieves mapping and information from the ontology data 910. The ontology data, as well as the manager system 908, in some embodiments are part of the ontology modeling system 909 discussed above. The manager system 908 manages the federated content query that calls one or more actions 914. As shown in the diagram, an action may have many decision blocks, inputs, mapped processes and many component references 992. Accordingly, for each component reference 992, one or more other components services 990 are called, which lead to one or more composite components 994, such as composite component 906 being called.

In summary, a composite, such as composite 906, contains one or more components 994, which implement the business functions or actions 914. The manager system 908 translates a client request, performs high level validations and invokes the appropriate composite by querying the ontology modeling system 909, including the ontology database 908, for information. The components expose their business functions or actions 914 as component services 990, which can either be used by other components 994 within the same composite 906 or which are made available for use outside the composite as composite services (not shown). Depending on the complexity of the composite 906, a synchronous and/or asynchronous communication method is used. Examples of functions performed by the manager system 908, and typically based on the retrieved ontology, include services orchestration, transformation, data aggregation, and fault management.

Various examples of composite components 906 include a security authentication service, a name & address lookup service, an accounts cross reference service, an account security authorization service, a repository 1 content service, a repository 2 content service, and/or a repository 3 content service. In this example, the three repository content services are for providing content. The authentication services, which in legacy examples, may have been performed manually, are, in some embodiments, performed automatically by the system.

In various embodiments of the system 900, a logical progression is built within the ontology modeling system 909 and the manager system 908 so that, for example, if multiple repositories are called, they can be called in a logical progression keeping in mind the entire action process flow and the desired end result. In some legacy systems, if multiple repositories were to be called, they were either called concurrently or were called manually, and therefore, successive steps within an action could not necessary rely on the outputs from the previous steps within the action.

Referring now to FIG. 10, a more detailed example of an entity relationship model 1000 as implemented by the ECM system is shown. At each level of the relationship model 1000, various attributes 1010 are defined regarding the entities 810, 820, 830, and 840. The entity relationship model 1000, in some embodiments, is implemented as a relational database having various tables and columns interacting with one another. Relationships among some of the various attributes, as stored in tables of a relational database in some embodiments, exist in the system, such as, for example, between the metadata model of the content type and the attributes model of the object type.

At the content type 820 level, a metadata model including one or more metadata definitions. Further, at the content type 820 level, one or more descriptors are used, such as, for example, a controlled vocabulary, as discussed above. Within the controlled vocabulary, in some embodiments, various domains are included such as, for example, a domain for a records management vocabulary and/or a business vocabulary. In this regard, for example, a content type has a standardized vocabulary used for referring to a particular record code, for example, an account number or some other identifying record code. The business vocabulary defines how to classify particular content. The system supports different vocabularies so that it can support a client seeking particular functionalities, but the client may not want to view all the various vocabularies involved. Also, the system does not access all the content repository indexes because it would be much more data than would be manageable. Thus, in some embodiments, only metadata necessary in order to understand and interact with each repository effectively is modeled.

On the action 840 side of the relationship model 1000, various action types are defined such as simple actions, as well as composite actions, as discussed with regard to FIG. 9 above. A composite function, in some embodiments, for example, is a specific chain solution exposed by a BPM solution. For example, complex or composite actions may be or include a "statement retrieval" or an "account opening retrieval." Some descriptors of the action are included as well. Specifically, information, such as additional metadata pertaining to the action is stored, for example, whether a particular mode of the action, that is, whether the action is performed synchronously or asynchronously or various other types of information.

On the repository 810 of the relationship model 1000, various descriptors such as repository type, performance constraints, file size constraints, and result list size constraints are included. Security rules and connection attributes are also included in the entity relationship model. These various attributes are stored and used by the ECM system in order to expose some of the information to the client as well as setting up some processing rules based on, for example, the number of items that can be retrieved by a particular repository.

When dealing with complex or even some simple actions, different metadata or indexes are called different things. For example, a bank account number can be referred to as "accountnum" "accountnumber" acctno" and the like. The relationship model includes the rules dictating how each repository stores its account numbers. This information is stored in the object type 830 within the attributes model and is mapped with the metadata model of the content type 820. In other words, instead of a user searching various databases manually, the system automatically, when a repository is called, applies the mapping of the relationship model such that the account number is effectively called from the repository regardless of the specific attribute used by the repository to represent the account number. If the user expects to pass a data to an object, for example, the expression rules define the required format for the data. One example of this is at a website, where an email address is requested. If the user does not include the "@" symbol, the email address is automatically rejected. This type of functionality is represented by the expression rules. This also enables some pre-validation in order to quickly recognize instances where the client, for example, has input information for consideration by the system and such information is of an improper format. The system can immediately reject the information and request correction early in the process so as to save unnecessary processing of invalid data. Various other capabilities can be built into the relationship model, and in various other embodiments, numerous other attributes can be maintained at the various entities.

FIG. 10B illustrates yet a more detailed embodiment of an entity relationship model 1050 as implemented by the ECM system.

Referring now to FIGS. 11A-11D, an example implementation of the ECM system 1100 is shown. In this example, the global documents online (GDOL) implementation of ECM system 1100 is shown. Consumers 1105 interact with the global documents online (GDOL) middleware system 1110, which is a management layer, similar to management layer 720 discussed above. The GDOL middleware system 1110 includes various operations or actions such as GDOL web services interface system 1120 and various ECM services 1125. Also included in the operations or actions of the GDOL middleware system 1100 are a security services system 1130 and an actions logging system 1140. The security services system 1130, in this implementation is an enterprise-specific security framework and interacts with the service-oriented process engine system 1150, and the service-oriented process engine system 1150 also sends information to the actions logging system 1140, which, in this embodiment, is a custom logging service. The service-oriented process engine system 1150, in this embodiment is a TIBCO (The Information Bus Company) ActiveMatrix BusinessWorks system. The service-oriented process engine system 1150 interacts with an ontology engine system 1160 similar to the ontology modeling system discussed above. In this embodiment, the ontology engine system 1160 includes one or more relational databases such as SQL Server or Oracle. Outside the GDOL middleware system 1110, the service-oriented process engine system 1150 interacts with an ECM repository adapter and common services system, which in this embodiment, includes a variety of adapters configured to access several types of data and content repositories 1180.

Figure 11A:
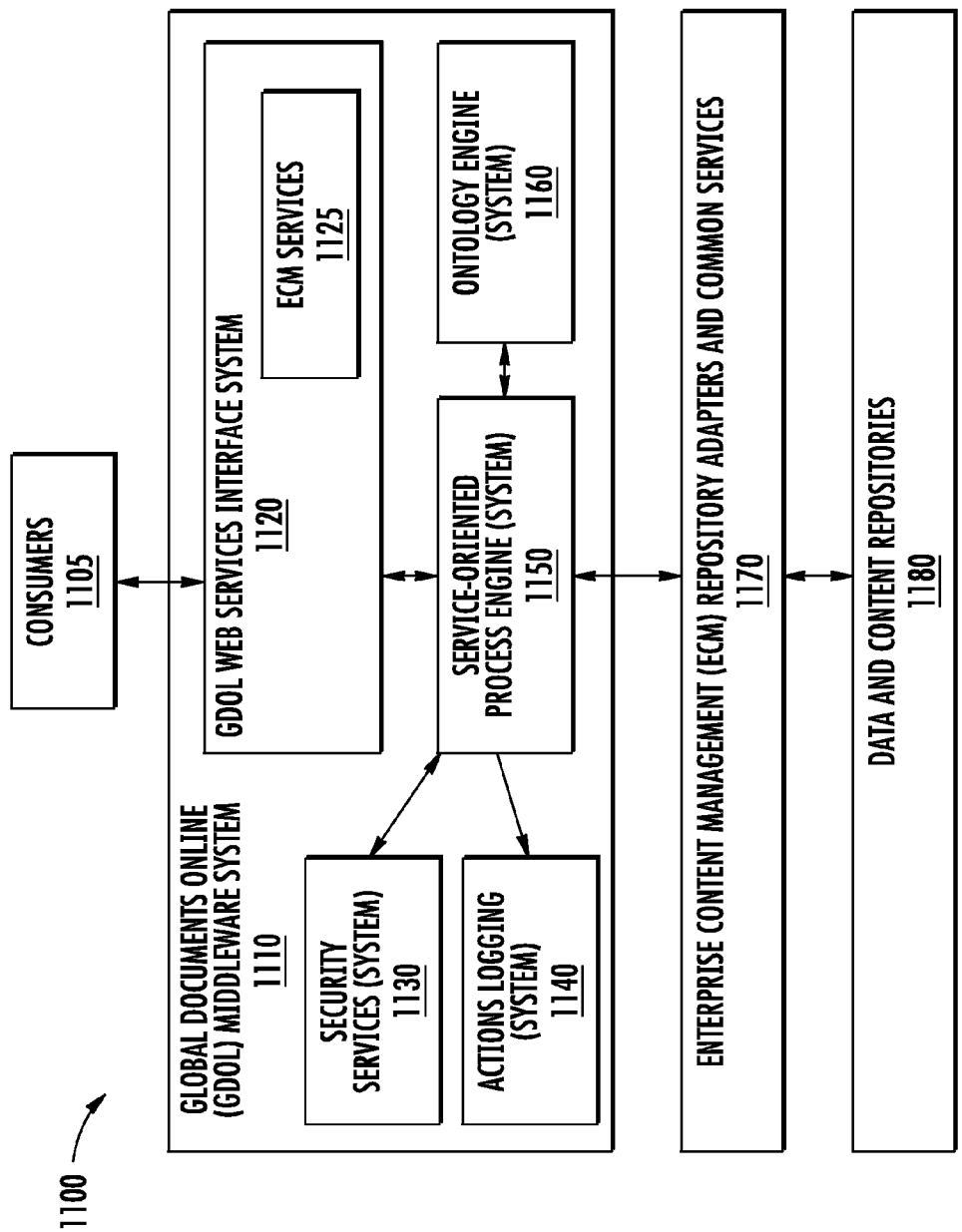
Figure 11B:
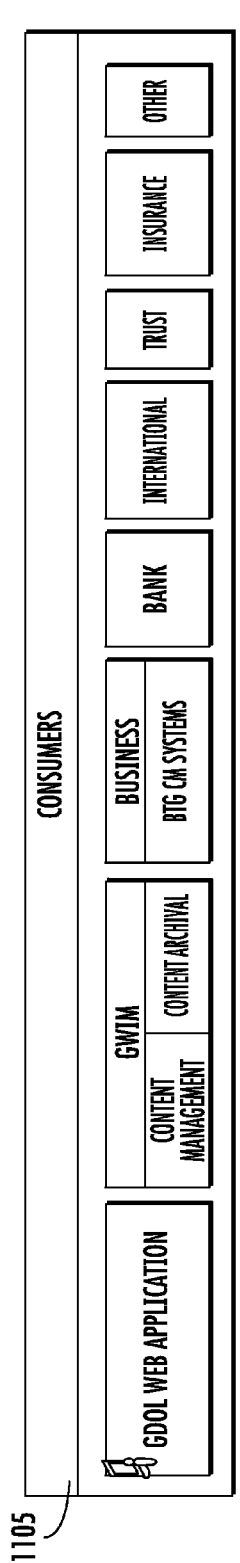

Referring now to FIG. 11B, the consumer 1105 are shown in greater detail. In this implementation, the GDOL web application functions as an interface for the consumers 1105. A global wave internet marketing (GWIM) system includes content management and content archival functions and interacts with the GDOL middleware system 1110. Other aspects on the consumer side are a BTG content management system. In various embodiments, the consumers include a bank, international consumers, trust consumers, insurance consumers and other consumers.

Figure 11C:
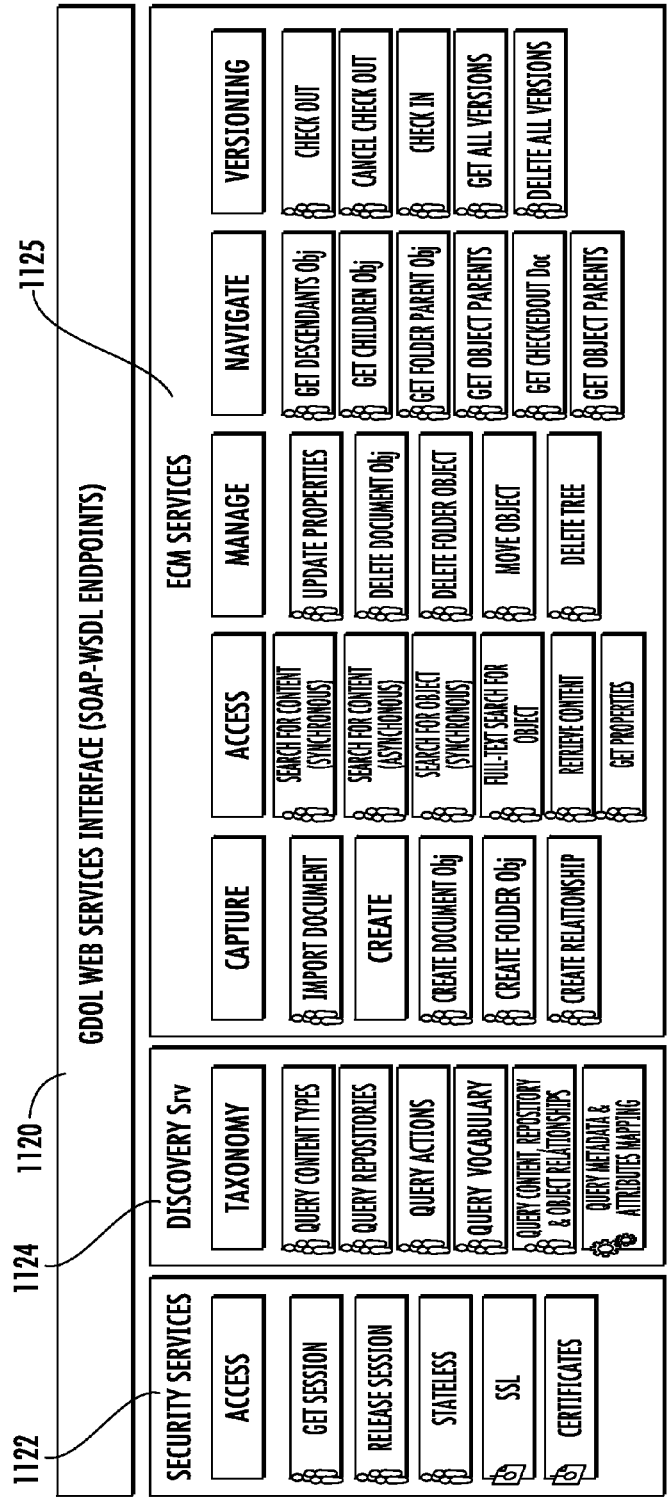

Referring now to FIG. 11C, a portion of the operations or actions of the GDOL middleware system 1110 are shown including the GDOL web services interface 1120, the security services system 1122, the discovery services system 1124, and the ECM services 1125.

Figure 11D:
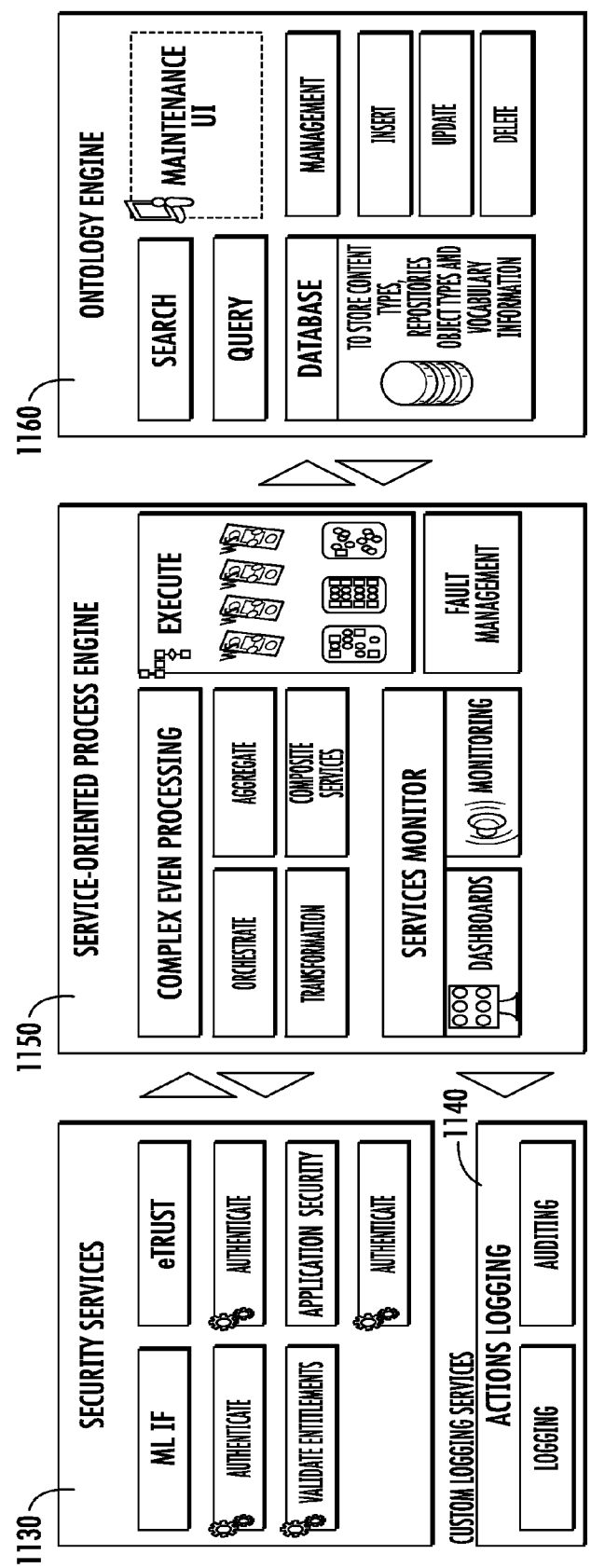

Referring now to FIG. 11D, another portion of the GDOL middleware system 1110 is shown. This portion includes a security services system 1130, an actions logging system 1140, a service-oriented process engine system 1150, and an ontology engine system 1160 are shown. The service-oriented process engine system 1150 is similar to and performs similar functions as the manager system 908 discussed above, and the ontology engine system 1160 is similar to and performs similar functions as the ontology modeling system 909 discussed above.

Referring now to FIG. 12A, a flowchart illustrating a method 1200A for enterprise content management according to embodiments of the invention is shown. The first step, as represented by block 1210 is receiving a request from a client system. In some embodiments, a composite system receives the request, and in others a processing device receives the request. The next step, as represented by block 1220, is translating the request from the client system. In some embodiments, a manager system translates the request, and in others a processing device translates the request. The next step, as represented by block 1230, is performing one or more high level validations. In some embodiments, the manager system performs the one or more validations, and in others, a processing device performs the validations. The next step, as represented by block 1240, is retrieving information from a mapping of a plurality of entities. The mapping, in some embodiments, includes a plurality of attributes including one or more metadata models or attribute models. The entities include, in some embodiments, one or more content types corresponding to one or more content items, one or more repositories, one or more actions, and/or one or more object types. The plurality of attributes includes, in some embodiments, for example, one or more metadata models and/or one or more attribute models. The next step, as represented by block 1250 is invoking one or more composites based at least in part on the request from the client system and some or all the information retrieved from the mapping. The next step, as represented by block 1255 is orchestrating one or more responses based at least in part on the one or more composites invoked. As discussed with reference to FIG. 12C, step 1255 in various embodiments includes one or more of normalizing and aggregating data, preparing responses and providing the responses to the client system.

Referring now to FIG. 12B, a flowchart illustrating a method 1200B for mapping entities according to embodiments of the invention is shown. In various embodiments, one or more of the steps of method 1200B are included and in other embodiments, one or more of the steps of method 1200B are not included. The first step in the embodiment shown, as represented by block 1260, is mapping one or more content types with one or more repositories such that the one or more content types references the one or more repositories. The next step, as represented by block 1270, is mapping the one or more repositories with one or more object types, thereby indicating that the one or more object types are included in the one or more repositories. The next step, as represented by block 1280, is mapping one or more content types with one or more actions such that the one or more content types expose the one or more actions. The next step, as represented by block 1290, is mapping one or more actions and one or more repositories such that the one or more actions executes against one or more repositories.

Referring now to FIG. 12C, a flowchart provides further details regarding an embodiment of step 1255, first presented in FIG. 12A. The first sub-step, as represented by block 1256 is normalizing data received as a result of invoking one or more of the composites. In one embodiment, for example, a composite accesses data from multiple databases having varying conventions for saving data. In such a situation, the system can normalize the data in order to provide proper context for the data. The next sub-step, as represented by block 1257, is aggregating the normalized data. The next sub-step, as represented by block 1258, is preparing one or more responses based on the aggregated data. For example, in one embodiment, the system prepares a response including information requested from the client system. The one or more responses, in some embodiments, are based at least in part on the normalized and aggregated data received as a result of invoking the one or more composites. The next sub-step, as represented by block 1259, is providing the one or more responses to the client system. In some embodiments, providing the responses to the client system includes communicating and/or transmitting the responses to the client system over a network. In other embodiments, for example, providing the responses includes producing instructions for displaying or communicating data from the client system to the client or user such as instructions for displaying data on a display device.

Referring now to FIG. 13A, a flowchart illustrating a method 1300A for mapping entities according to other embodiments of the invention is shown. The method, in some embodiments, is performed by an ontology modeling system. The first step, as represented by block 1310 is mapping a plurality of entities with one another, the plurality of entities comprising one or more content types, one or more repositories, one or more object types, and one or more actions. Step 1310, in various embodiments, includes one or more sub-steps, as represented by blocks 1320, 1330, 1340, and 1350 in the illustrated embodiment. In the first sub-step, as represented by block 1320, the ontology modeling system associates the one or more content types with one or more repositories such that the one or more content types references the one or more repositories. The next step, as represented by block 1330, is associating the one or more repositories with one or more object types, thereby indicating that the one or more object types are included in the one or more repositories. The next step, as represented by block 1340, is associating the one or more content types with one or more actions such that the one or more content types expose the one or more actions. The next step, as represented by block 1350, is associating the one or more actions with one or more repositories such that the one or more actions executes against one or more repositories. The next step in method 1300A, as represented by block 1315, is retrieving information from the mapping of the plurality of entities in response to a request from a manager system, in some embodiments.

Referring now to FIG. 13B, a flowchart illustrating a method 1300B for mapping additional entities according to embodiments of the invention is shown. In some embodiments, method 1300B is executed by an ontology modeling system. As discussed above regarding method 1300A, various embodiments of method 1300B include varying combinations of the steps included in FIG. 13B. In some embodiments, all the steps are included. The first step, as represented by block 1355 is mapping one or more pieces of metadata, one or more expressions, one or more attribute types, and one or more content items. In various embodiments, one, two, or three of these entities are mapped, and in some embodiments, all four of them are mapped. In various embodiments, one or more of sub-steps 1360, 1365, 1370, 1375, 1380, and 1385 are included in various combinations.

In the embodiment shown, the first step, as represented by block 1360 is associating the one or more expressions with one or more pieces of metadata such that the one or more expressions validate the one or more pieces of metadata. The next step, as represented by block 1365, is associating the one or more content types with one or more pieces of metadata such that the one or more content types reference the one or more pieces of metadata. The next step, as represented by block 1370, is associating the one or more pieces of metadata with one or more attribute types such that the one or more pieces of metadata map to one or more attribute types. The next step, as represented by block 1375, is associating one or more object types with one or more attribute types such that the one or more object types expose one or more attribute types. The next step, as represented by block 1380, is associating the one or more actions with one or more pieces of metadata such that the one or more actions use one or more pieces of metadata. The next step, as represented by block 1385, is associating the one or more content types with one or more content items such that the one or more content types include one or more content items.

Referring now to FIG. 14A, a block diagram illustrating an enterprise content management environment 1400 in which the various methods described herein are performed is shown according to embodiments of the invention. An enterprise content management federation and integration (ECMFI) system 1401 is a computer system, server, multiple computer systems and/or servers or the like. The ECMFI system 1401, in the embodiments shown has a communication device 1412 communicably coupled with a processing device 1414, which is also communicably coupled with a memory device 1416. The processing device is configured to control the communication device 1412 such that the ECMFI system 1401 communicates across the network 1402 with one or more other systems. The processing device is also configured to access the memory device 1416 in order to read the computer readable instructions 1418, which in some embodiments include a enterprise content management application 1409. The memory device 1416 also has a datastore 1419 or database for storing pieces of data for access by the processing device 1414.

The enterprise content management application 1409 is configured for instructing the processing device 1414 to perform various steps of the methods discussed herein, and/or other steps and/or similar steps. In various embodiments, the enterprise content management application 1409 is included in the computer readable instructions stored in a memory device of one or more systems other than the ECMFI system 1401. For example, in some embodiments, enterprise content management application 1409 is stored and configured for being accessed by a processing device of one or more of a manager system 1403, a composite system 1404, and an ontology modeling system 1408.

A composite system 1404 is a computer system, server, multiple computer system, multiple servers, or some other computing device. The composite system 1404 has a communication device 1422 communicatively coupled with a processing device 1424, which is also communicatively coupled with a memory device 1426. The processing device 1424 is configured to control the communication device 1422 such that the composite system 1404 communicates across the network 1402 with one or more other systems. The processing device 1424 is also configured to access the memory device 1426 in order to read the computer readable instructions 1428, which in some embodiments include a composite system application 1420 and an enterprise content management application 1409. The memory device 1426 also has a datastore 1429 or database for storing pieces of data for access by the processing device 1424. The composite system application 1420 is configured to perform various steps disclosed herein as discussed above, and the enterprise content management application 1409 is configured to perform various steps disclosed herein as well.

The manager system 1403, in some embodiments, includes a communication device 1442 communicatively coupled with a processing device 1444, which is also communicatively coupled with a memory device 1446. The processing device 1444 is configured to control the communication device 1442 such that the manager system 1403 communicates across the network 1402 with one or more other systems. The processing device 1444 is also configured to access the memory device 1446 in order to read the computer readable instructions 1448, which in some embodiments include a manager application 1440 for instructing the processing device 1444. The memory device 1446 also has a datastore 1449 or database for storing pieces of data for access by the processing device 1444.

The ontology modeling system 1408 is configured for mapping entities for use with the ECMFI system. In some embodiments, the ontology modeling system 1408 includes a communication device 1432 communicatively coupled with a processing device 1434, which is also communicatively coupled with a memory device 1436. The processing device 1434 is configured to control the communication device 1432 such that the ontology modeling system 1408 communicates across the network 1402 with one or more other systems. The processing device 1434 is also configured to access the memory device 1436 in order to read the computer readable instructions 1438, which in some embodiments include one or more of the enterprise content management application 1409, the ontology modeling application 1450. Both the ontology modeling application and the enterprise content management application, as discussed above, in various embodiments, are configured for instructing the processing device 1434 for performing one or more of the method steps discussed herein, and/or other steps. The memory device 1446 also has a datastore 1449 or database for storing pieces of data for access by the processing device 1444.

In various embodiments, one of the systems discussed above, such as the ECMFI system 1401, is more than one system and the various components of the system are not collocated, and in various embodiments, there are multiple components performing the functions indicated herein as a single device. For example, in one embodiment, multiple processing devices perform the functions of the processing device 1414 of the ECMFI system 1401 described herein.

In the embodiment shown, a client system 1500 is in communication with the enterprise content management federation and integration system 1401 via network 1402. Additionally, the client system 1500 is in communication with one or more other systems in various embodiments. The client system 1500, in some embodiments, includes a communication device 1502 configured for communicating with one or more systems across network 1402 as instructed by processing device 1504. The processing device is connected to memory device 1506, which includes computer readable and executable instructions 1508, such as, for example, a client system application 1510 and an enterprise content management application 1512. In various embodiments, the client system 1500 includes only a client system application 1510 having instructions for the client system to perform various method steps as discussed herein, and in other embodiments, the client system 1500 includes only an enterprise content management application 1512, which includes instructions for the client system to perform various method steps discussed herein.

In various embodiments, one or more of the components, systems, services, layers or any other items discussed above may or may not be part of the system. In some embodiments such items may or may not be part of an environment wherein the system operates. In some embodiments, one or more of such items may or may not be included in one or more of the various embodiments discussed herein. In other embodiments, one or more of the systems are collocated. In some embodiments, two or more of the systems discussed herein are the same system. In such embodiments, the two or more systems share a processing device, and in some embodiments, a memory device as well as other components. In some embodiments, the enterprise content management application includes one or more of the other applications disclosed herein.

Referring now to FIG. 14B, another embodiment of an ECMFI system 1401 is shown. In this embodiment, the ECMFI system 1401 performs the functions of the manager system, the composite system, and the ontology modeling system discussed above. The computer readable instructions 1418 for this embodiment include the enterprise content management application 1409, the composite system application 1420, the manager application 1440, and the ontology modeling application 1450. In some embodiments, one or more of applications 1420, 1440 and 1450 are part of the enterprise content management application.

The enterprise content management federation and integration system 1401 is in communication with one or more systems, such as client system 1522, client system 1524, system 1526, system 1528, and system 1530. In various embodiments, only one client system and/or only one other system are in communication with the enterprise content management federation and integration system 1401, and in various other embodiments, several client systems and/or other systems are in communication with the enterprise content management federation and integration system 1401 via network 1520. In some embodiments, for example, the enterprise content management federation and integration system 1401 is in communication with one client system and several other systems via the network. Accordingly, the enterprise content management federation and integration system 1401 is configured to receive a request from the client system as discussed above in FIG. 12A, and thereafter perform one or more of the other steps discussed herein.

Embodiments of the present invention address the above needs and/or achieve other advantages by providing methods, computer program products and enterprise content management systems for integrating a plurality of applications and federating federates information seamlessly. The systems receive, by a composite system, a request from a client system. The system then translates, by a manager system, the request from the client system. The manager system performs one or more high level validations and retrieves information from a mapping stored by an ontology modeling system, a plurality of content types, repositories, actions and object types based at least in part on a plurality of attributes including one or more metadata models or attribute models. The manager system then invokes one or more composites based at least in part on the request from the client system and some or all the information retrieved from the mapping.

As used herein, a "processing device" generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities.

As used herein, a "communication device" generally includes a modem, server, transceiver, and/or other device for communicating with other devices directly or via a network, and/or a user interface for communicating with one or more users. As used herein, a "user interface" generally includes a display, mouse, keyboard, button, touchpad, touch screen, microphone, speaker, LED, light, joystick, switch, buzzer, bell, and/or other user input/output device for communicating with one or more users.

As used herein, a "memory device" or "memory" generally refers to a device or combination of devices including one or more forms of non-transitory computer-readable media for storing instructions, computer-executable code, and/or data thereon. Computer-readable media is defined in greater detail herein below. It will be appreciated that, as with the processing device, each communication interface and memory device may be made up of a single device or many separate devices that conceptually may be thought of as a single device.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor/processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, combinations, and modifications of the just described embodiments can be configured without departing from the scope and spirit of the invention. Therefore, it is to be understood that, within the scope of the appended claims, the invention may be practiced other than as specifically described herein.

What is claimed is:

1. An enterprise content management integration and federation system for integrating a plurality of applications and federating information, the system comprising:

a composite system comprising a first memory storing first instructions for execution by a first processing device that is configured for receiving a request from a client system, the composite system comprising:
  a manager system configured for:
    initiating a mediation flow comprising a predetermined mapped process flow configured to achieve a result in response to the received request, the mediation flow comprising:
      translating the request from the client system; and
      performing one or more high level validations; and
an ontology modeling system comprising a second memory storing second instructions for execution by a second processing device that is configured for retrieving information from a mapping of a plurality of entities, the mapping comprising a plurality of attributes and
wherein the manager system is further configured for:
  continuing the mediation flow by invoking a plurality of composites based at least in part on the request from the client system and some or all the information retrieved from the mapping, the invoking comprising:
    initiating a plurality of actions each initiated in response to the invoking of one of the plurality of composites, where at least one of the plurality of actions comprises at least one decision block, input or mapped process and wherein:
at least one of the plurality of actions comprises at least one component reference that initiates a component service that invokes at least one additional composite comprising a first repository content service;
at least one of the plurality of actions comprises at least one component reference that initiates a component service that invokes at least one additional composite comprising a second repository content service distinct from the first repository content service;
at least one of the plurality of actions comprises at least one component reference that initiates a component service that invokes at least one additional composite comprising a security authentication service;
at least one of the plurality of actions comprises at least one component reference that initiates a component service that invokes at least one additional composite comprising a name and address lookup service; and
at least one of the plurality of actions comprises at least one component reference that initiates a component service that invokes at least one additional composite comprising an account cross reference service.

2. The system of claim 1, wherein the plurality of entities includes one or more content types.

3. The system of claim 2, wherein the one or more content types each corresponds to one or more content items.

4. The system of claim 1, wherein the plurality of entities includes one or more repositories.

5. The system of claim 1, wherein the plurality of entities includes one or more actions.

6. The system of claim 1, wherein the plurality of entities includes one or more object types.

7. The system of claim 1, wherein the plurality of attributes comprise one or more metadata models.

8. The system of claim 1, wherein the plurality of attributes comprise one or more attribute models.

9. The system of claim 1, wherein the plurality of entities includes one or more content types, one or more repositories, one or more actions, and one or more object types.

10. The system of claim 9, wherein the ontology modeling system is further configured for:
mapping one or more content types with one or more repositories such that the one or more content types references the one or more repositories.

11. The system of claim 9, wherein the ontology modeling system is further configured for:
mapping one or more repositories with one or more object types, thereby indicating that the one or more object types are included in the one or more repositories.

12. The system of claim 9, wherein the ontology modeling system is further configured for:
mapping one or more content types with one or more actions such that the one or more content types exposes the one or more actions.

13. The system of claim 9, wherein the ontology modeling system is further configured for:
mapping one or more actions with one or more repositories such that the one or more actions executes against one or more repositories.

14. A method for enterprise content management including integrating a plurality of applications and federating information, the method comprising:
receiving, by a composite system, a request from a client system;
initiating a mediation flow comprising a predetermined mapped process flow configured to achieve a result in response to the received request, the mediation flow comprising:
  translating, by a manager system, the request from the client system; and
  performing, by the manager system, one or more high level validations; and retrieving information from a mapping, by an ontology modeling system, of a plurality of entities, the mapping comprising a plurality of attributes; and continuing the mediation flow by invoking, by the manager system, a plurality of composites based at least in part on the request from the client system and some or all the information retrieved from the mapping, the invoking comprising:

initiating a plurality of actions each initiated in response to the invoking of one of the plurality of composites, where at least one of the plurality of actions comprises at least one decision block, input or mapped process and wherein:

at least one of the plurality of actions comprises at least one component reference that initiates a component service that invokes at least one additional composite comprising a first repository content service;

at least one of the plurality of actions comprises at least one component reference that initiates a component service that invokes at least one additional composite comprising a second repository content service distinct from the first repository content service;

at least one of the plurality of actions comprises at least one component reference that initiates a component service that invokes at least one additional composite comprising a security authentication service;

at least one of the plurality of actions comprises at least one component reference that initiates a component service that invokes at least one additional composite comprising a name and address lookup service; and at least one of the plurality of actions comprises at least one component reference that initiates a component service that invokes at least one additional composite comprising an account cross reference service.

15. The method of claim 14, wherein the plurality of entities includes one or more content types.

16. The method of claim 15, wherein the one or more content types each corresponds to one or more content items.

17. The method of claim 14, wherein the plurality of entities includes one or more repositories.

18. The method of claim 14, wherein the plurality of entities includes one or more actions.

19. The method of claim 14, wherein the plurality of entities includes one or more object types.

20. The method of claim 14, wherein the plurality of attributes comprise one or more metadata models.

21. The method of claim 14, wherein the plurality of attributes comprises one or more attribute models.

22. The method of claim 14, wherein the composite system, the manager system and the ontology system are the same system comprising a processing device and wherein the steps of retrieving, translating, performing, retrieving and invoking are executed by the processing device.

23. The method of claim 14, wherein the composite system and the manager system are the same system comprising a processing device and wherein the steps of retrieving, translating, performing, and invoking are executed by the processing device.

24. The method of claim 14, wherein the plurality of entities includes one or more content types, one or more repositories, one or more actions, and one or more object types.

25. The method of claim 24, further comprising:
mapping, by the ontology modeling system, one or more content types with one or more repositories such that the one or more content types references the one or more repositories.

26. The method of claim 24, further comprising:
mapping, by the ontology modeling system, one or more repositories with one or more object types, thereby indicating that the one or more object types are included in the one or more repositories.

27. The method of claim 24, further comprising:
mapping, by the ontology modeling system, one or more content types with one or more actions such that the one or more content types exposes the one or more actions.

28. The method of claim 24, further comprising:
mapping, by the ontology modeling system, one or more actions with one or more repositories such that the one or more actions executes against one or more repositories.

29. A computer program product comprising a non-transient computer-readable memory comprising computer-executable instructions for enterprise content management including integrating a plurality of applications and federating information, the instructions comprising:

instructions for initiating a mediation flow comprising a predetermined mapped process flow configured to achieve a result in response to the received request, the mediation flow comprising:
receiving a request from a client system; and
translating the request from the client system; and
instructions for performing one or more high level validations;
instructions for retrieving information from a mapping of a plurality of entities; and
instructions for continuing the mediation flow by invoking, by the manager system, a plurality of composites based at least in part on the request from the client system and some or all the information retrieved from the mapping, the invoking comprising:
initiating a plurality of actions each initiated in response to the invoking of one of the plurality of composites, wherein:
at least one of the plurality of actions comprises at least one decision block, input or mapped process and where at least one of the plurality of actions comprises at least one component reference that initiates a component service that invokes at least one additional composite comprising a repository content service;
at least one of the plurality of actions comprises at least one component reference that initiates a component service that invokes at least one additional composite comprising a second repository content service distinct from the first repository content service;
at least one of the plurality of actions comprises at least one component reference that initiates a component service that invokes at least one additional composite comprising a security authentication service;
at least one of the plurality of actions comprises at least one component reference that initiates a component service that invokes at least one additional composite comprising a name and address lookup service; and
at least one of the plurality of actions comprises at least one component reference that initiates a component service that invokes at least one additional composite comprising an account cross reference service.

30. The computer program product of claim 29, wherein the plurality of entities includes one or more content types.

31. The computer program product of claim 30, wherein the one or more content types each corresponds to one or more content items.

32. The computer program product of claim 29, wherein the plurality of entities includes one or more repositories.

33. The computer program product of claim 29, wherein the plurality of entities includes one or more actions.

34. The computer program product of claim 29, wherein the plurality of entities includes one or more object types.

35. The computer program product of claim 29, wherein the plurality of attributes comprise one or more metadata models.

36. The computer program product of claim 29, wherein the plurality of attributes comprise one or more attribute models.

37. The computer program product of claim 29, wherein the plurality of entities includes one or more content types, one or more repositories, one or more actions, and one or more object types.

38. The computer program product of claim 29, wherein the instructions further comprise:
   instructions for mapping one or more content types with one or more repositories such that the one or more content types references the one or more repositories.

39. The computer program product of claim 29, wherein the instructions further comprise:
   instructions for mapping one or more repositories with one or more object types, thereby indicating that the one or more object types are included in the one or more repositories.

40. The computer program product of claim 29, wherein the instructions further comprise:
   instructions for mapping one or more content types with one or more actions such that the one or more content types exposes the one or more actions.

41. The computer program product of claim 29, wherein the instructions further comprise:
   instructions for mapping one or more actions with one or more repositories such that the one or more actions executes against one or more repositories.

* * * * *

UNITED STATES PATENT AND TRADEMARK OFFICE
CERTIFICATE OF CORRECTION

| | | |
|---|---|---|
| PATENT NO. | : 8,812,544 B2 | Page 1 of 1 |
| APPLICATION NO. | : 13/019051 | |
| DATED | : August 19, 2014 | |
| INVENTOR(S) | : Jeffrey S. Engelhardt et al. | |

It is certified that error appears in the above-identified patent and that said Letters Patent is hereby corrected as shown below:

On the Title page, Item (75), change the name of sixth inventor from "Michael R. Evans, Jacksonville, FL (US)"; to --Michael J. Evans, Jacksonville, FL (US)--

Signed and Sealed this
Fifth Day of May, 2015

Michelle K. Lee
*Director of the United States Patent and Trademark Office*